(12) United States Patent
Wanibe

(10) Patent No.: US 7,874,143 B2
(45) Date of Patent: Jan. 25, 2011

(54) AIR-FUEL RATIO CONTROL APPARATUS OF INTERNAL COMBUSTION ENGINE AND CONTROL METHOD THEREOF

(75) Inventor: Masahiro Wanibe, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 856 days.

(21) Appl. No.: 11/582,366

(22) Filed: Oct. 18, 2006

(65) Prior Publication Data

US 2007/0084192 A1 Apr. 19, 2007

(30) Foreign Application Priority Data

Oct. 19, 2005 (JP) ............... 2005-303887

(51) Int. Cl.
*F01N 3/00* (2006.01)
*F01N 3/10* (2006.01)

(52) U.S. Cl. .............. 60/285; 60/274; 60/276; 60/299

(58) Field of Classification Search ........... 60/285, 60/276–277, 273–274, 299; 701/109, 111; 123/435, 436, 679
See application file for complete search history.

(56) References Cited

U.S. PATENT DOCUMENTS

| | | | | |
|---|---|---|---|---|
| 5,077,970 A | * | 1/1992 | Hamburg | 60/274 |
| 5,680,002 A | * | 10/1997 | Kunitomo et al. | 313/141 |
| 5,824,890 A | * | 10/1998 | La Palm et al. | 73/114.04 |
| 5,909,724 A | | 6/1999 | Nishimura et al. | |
| 6,223,121 B1 | * | 4/2001 | Ishida et al. | 701/113 |
| 6,405,122 B1 | * | 6/2002 | Yamaguchi | 701/106 |
| 2004/0006971 A1 | * | 1/2004 | Kamoto et al. | 60/277 |

FOREIGN PATENT DOCUMENTS

| | | |
|---|---|---|
| DE | 44 42 734 A1 | 6/1995 |
| DE | 699 02 992 T2 | 5/2003 |
| DE | 103 28 015 A1 | 1/2005 |
| JP | A-10-176578 | 6/1998 |
| JP | A 10-220269 | 8/1998 |
| JP | B2 3039162 | 3/2000 |
| JP | A 2003-195906 | 7/2003 |
| JP | A 2004-183585 | 7/2004 |
| JP | A 2004-211604 | 7/2004 |

OTHER PUBLICATIONS

Robert Bosch Gmbh. "Abgastechnik für Ottomotoren." *Kraftahrzeugtechnik*; 2002; pp. 60-61.
Aug. 12, 2010 German Office Action issued in German Patent Application No. 10 2006 035 356.0 with English translation.
Aug. 5, 2008 Japanese Office Action issued in Japanese Patent Application No. 2005-303887 with English translation.

* cited by examiner

*Primary Examiner*—Thomas E Denion
*Assistant Examiner*—Audrey Klasterka
(74) *Attorney, Agent, or Firm*—Oliff & Berridge, PLC

(57) ABSTRACT

An air-fuel ratio control apparatus and control method thereof performs air-fuel ratio feedback control based on an estimated value (i.e., an upstream side estimated air-fuel ratio) of an air-fuel ratio of gas discharged from a combustion chamber into an exhaust passage and an output value of an air-fuel ratio sensor downstream of a catalyst. This upstream side estimated air-fuel ratio is accurately estimated based on an operating state of the engine and a combustion state (i.e., the degree of misfire in the combustion chamber) of the engine.

24 Claims, 9 Drawing Sheets

AIR-FUEL RATIO CONTROL APPARATUS OF INTERNAL COMBUSTION ENGINE AND CONTROL METHOD THEREOF

INCORPORATION BY REFERENCE

The disclosure of Japanese Patent Application No. 2005-303887 filed on Oct. 19, 2005, including the specification, drawings and abstract is incorporated herein by reference in its entirety.

BACKGROUND OF THE INVENTION

1. Field of the Invention

The invention relates to an air-fuel ratio control apparatus of an internal combustion engine, which controls the air-fuel ratio of gas flowing into a catalyst arranged in an exhaust passage of the internal combustion engine, and a control method of that air-fuel ratio control apparatus.

2. Description of the Related Art

Japanese Patent Application Publication No. JP-A-2004-183585, for example, describes a widely known air-fuel ratio control apparatus which is provided with an air-fuel ratio sensor both upstream and downstream of a catalyst (a three-way catalyst) arranged in an exhaust passage of an internal combustion engine, and feedback controls the air-fuel ratio of the air-fuel mixture supplied to the internal combustion engine (and therefore the air-fuel ratio of the gas flowing into the catalyst) based on output values from the air-fuel ratio sensors. The apparatus described in that publication uses a so-called limiting current oxygen content sensor for the upstream side air-fuel ratio sensor and a so-called concentration cell oxygen content sensor for the downstream side air-fuel ratio sensor.

Air-fuel ratio sensors are generally known to have a characteristic in which their sensitivity changes, which in turn results in a change in output value, when the manner in which the gas contacts the detecting portion (hereinafter simply referred to as "manner of gas contact") changes, even if the air-fuel ratio of the gas that contacts the detecting portion is the same.

Here, the manner in which gas that is discharged from the combustion chamber into an exhaust passage via an exhaust valve flows (such as the direction of the flow and the flow rate) changes according to the operating state of the engine. Accordingly, the manner in which gas contacts the detecting portion of the upstream side air-fuel ratio sensor arranged in the exhaust passage in a position relatively near the exhaust valve can also change according to the operating state of the engine. As a result, the output value of the upstream side air-fuel ratio sensor depends on the manner of gas contact and thus may change even if the air-fuel ratio of the gas contacting the detecting portion is the same.

In addition, an air-fuel ratio sensor is also generally known that has a characteristic in which the output value changes when the composition of gas contacting the detecting portion changes, even if the air-fuel ratio of that gas is the same. More specifically, there is a tendency for the rate of diffusion to increase in the detecting portion the smaller the molecular mass of the composition of the gas that contacts the detecting portion. Accordingly, for example, even if the air-fuel ratio of the gas contacting the detecting portion is the same, the output value of the air-fuel ratio sensor tends to shift to a richer value when the molecular mass in the gas contacting the detecting portion is small and the composition ratio of hydrogen which is a reducing agent is large.

Here, the composition of the gas that is discharged from the combustion chamber into the exhaust passage via the exhaust valve also changes according to the operating state of the engine. Accordingly, the composition of the gas contacting the detecting portion of the upstream side air-fuel ratio sensor arranged in the exhaust passage in a position relatively close to the exhaust valve can also change according to the operating state of the engine. As a result, the output value of the upstream side air-fuel ratio sensor may change depending on the composition of the gas, even if the air-fuel ratio of the gas contacting the detecting portion is the same.

As described above, the output value of the upstream side air-fuel ratio sensor may be different from a value corresponding to the true air-fuel ratio of the gas contacting the detecting portion depending on the manner of gas contact or the composition of the gas. Therefore, appropriate feedback control may not be performed on the air-fuel ratio if it is performed using the output value itself of the upstream side air-fuel ratio sensor.

SUMMARY OF THE INVENTION

This invention thus provides an air-fuel ratio control apparatus of an internal combustion engine, which can appropriately feedback control an air-fuel ratio without using the output value itself from an upstream side air-fuel ratio sensor, as well as a control method of that air-fuel ratio control apparatus.

A first aspect of the invention relates to an air-fuel ratio control apparatus of an internal combustion engine, which is applied to an internal combustion engine that has a catalyst (a three-way catalyst) arranged in an exhaust passage of the internal combustion engine, and a downstream side air-fuel ratio sensor which is arranged in the exhaust passage downstream of the catalyst and outputs a value indicative of an air-fuel ratio of gas flowing out from the catalyst. The downstream side air-fuel ratio sensor may be a so-called limiting current oxygen content sensor or a so-called concentration cell oxygen content sensor. From the viewpoint of reducing manufacturing costs, however, a concentration cell oxygen content sensor is preferably used.

The air-fuel ratio control apparatus according to the first aspect of the invention includes a catalyst upstream air-fuel ratio estimating device which estimates an upstream side estimated air-fuel ratio corresponding value which corresponds to the air-fuel ratio of gas discharged from a combustion chamber of the internal combustion engine into the exhaust passage based on an operating state of the internal combustion engine and a combustion state of the internal combustion engine, and an air-fuel ratio control device which controls the air-fuel ratio of gas flowing into the catalyst based on the estimated upstream side estimated air-fuel ratio corresponding value and the output value of the downstream side air-fuel ratio sensor. Here, the upstream side estimated air-fuel ratio corresponding value is, for example, the estimated value itself of the air-fuel ratio of the gas discharged from the combustion chamber into the exhaust passage, or an air-fuel ratio sensor output value (i.e., voltage value) corresponding to the estimated value of that air-fuel ratio, or the like.

In this way, the air-fuel ratio control apparatus according to the first aspect of the invention differs from the related art described in the foregoing publication which performs feedback control on the air-fuel ratio based on the output values of both the upstream side air-fuel ratio sensor and the downstream side air-fuel ratio sensor in that this apparatus uses an upstream side estimated air-fuel ratio corresponding value that was estimated by the catalyst upstream air-fuel ratio estimating device instead of the output value of the upstream side air-fuel ratio sensor in the air-fuel ratio feedback control.

Accordingly, because air-fuel ratio feedback control is not executed using the output value itself of the upstream side air-fuel ratio sensor, the problem of feedback control not being performed appropriately on the air-fuel ratio due to the manner of gas contact or the gas composition will not occur. Also, the upstream side estimated air-fuel ratio corresponding value which corresponds to the air-fuel ratio of the gas discharged from the combustion chamber into the exhaust passage is able to be accurately estimated based on the operating state of the engine (such as the fuel injection quantity and the in-cylinder intake air quantity) and the combustion state in the engine (such as the degree of misfire in the combustion chamber), thus enabling appropriate feedback control to be performed on the air-fuel ratio based on the upstream side estimated air-fuel ratio corresponding value.

In addition, according to the foregoing structure, the upstream side air-fuel ratio sensor can be omitted from the structure of the apparatus, which enables manufacturing costs of the apparatus on the whole to be reduced. Moreover, according to the foregoing structure, the air-fuel ratio feedback control is performed based not only on the upstream side estimated air-fuel ratio corresponding value but also on the output value of the downstream side air-fuel ratio sensor. The air-fuel ratio of the gas flowing out from the catalyst changes relatively smoothly and constantly from the so-called oxygen storage function of the catalyst (a three-way catalyst) so the output value of the downstream side air-fuel ratio sensor also changes relatively smoothly and constantly. Accordingly, air-fuel ratio feedback control that is based on the output value of the downstream side air-fuel ratio sensor is able to compensate for the constant error in the upstream side estimated air-fuel ratio corresponding value.

In this case, more specifically, the catalyst upstream air-fuel ratio estimating device is preferably structured to obtain a value of a parameter that changes according to a degree of misfire in the combustion chamber, which corresponds to the combustion state, based on the operating state of the internal combustion engine, and estimate the upstream side estimated air-fuel ratio corresponding value based on the operating state and the obtained value of the parameter.

Accordingly, for example, the catalyst upstream air-fuel ratio estimating device can accurately estimate the upstream side estimated air-fuel ratio corresponding value by obtaining, as the parameter, a coefficient equal to or greater than "0" and equal to or less than "1" which decreases as the degree of misfire in the combustion chamber increases, and multiplying the quotient of the in-cylinder intake air quantity divided by the fuel injection quantity, which is the air-fuel ratio obtained from the operating state, by this coefficient.

The value of this parameter is preferably obtained based on, for example, at least one of an operating speed of the internal combustion engine, a quantity of air drawn into the combustion chamber on an intake stroke (i.e., the in-cylinder intake air quantity), and a temperature of a wall surface of the combustion chamber. Generally, the degree of misfire in the combustion chamber tends to increase the lower the operating speed of the internal combustion engine, the smaller the in-cylinder intake air quantity, and the lower the temperature of the wall surface of the combustion chamber. Therefore, according to the foregoing structure, the value of the parameter that changes according to the degree of misfire in the combustion cylinder can be accurately obtained regardless of the operating state of the engine.

In order to control the air-fuel ratio of the gas flowing into the catalyst, the air-fuel ratio control device may also control the air-fuel ratio (i.e., the fuel injection quantity) of the air-fuel mixture supplied to the combustion chamber of the engine, or may supply a reducing agent or an oxidizing agent into the exhaust passage upstream of the catalyst from the outside.

An air-fuel ratio control apparatus of an internal combustion engine according to a second aspect of the invention is applied to an internal combustion engine provided with a catalyst (a three-way catalyst) arranged in an exhaust passage of the internal combustion engine, and an upstream side air-fuel ratio sensor which is arranged in the exhaust passage upstream of the catalyst and outputs a value indicative of an air-fuel ratio of gas discharged from a combustion chamber of the internal combustion engine into the exhaust passage. The upstream side air-fuel ratio sensor may be a so-called limiting current oxygen content sensor or a so-called concentration cell oxygen content sensor. From the viewpoint of accurately detecting the air-fuel ratio over a wide range, however, a limiting current oxygen content sensor is preferably used.

The air-fuel ratio control apparatus according to the second aspect of the invention also includes catalyst upstream air-fuel ratio estimating device which is the same as that in the air-fuel ratio control apparatus according to the first aspect described above, a correcting device which corrects the estimated upstream side estimated air-fuel ratio corresponding value using a value obtained by high-pass filter processing an output value of the upstream side air-fuel ratio sensor, and an air-fuel ratio control device which controls the air-fuel ratio of gas flowing into the catalyst based on the upstream side estimated air-fuel ratio corresponding value that was corrected by the correcting device.

In this case, the internal combustion engine to which the air-fuel ratio control apparatus according to the second aspect is applied is preferably structured to also include a downstream side air-fuel ratio sensor, and the air-fuel ratio controlling device is preferably structured to control the air-fuel ratio of the gas flowing into the catalyst based on the output value of the downstream side air-fuel ratio sensor as well as the upstream side estimated air-fuel ratio corresponding value that was corrected by the correcting device.

Error in the output value of the upstream side air-fuel ratio sensor that depends on the manner of gas contact and the composition of the gas tends to be expressed as relatively constant error. In other words, the error in the output value of the upstream side air-fuel ratio sensor that depends on the manner of gas contact and the composition of the gas can be removed by high-pass filter processing the output value of the upstream side air-fuel ratio sensor. Meanwhile, a temporary change in the air-fuel ratio can be expressed as a change in the value obtained by high-pass filter processing the output value of the upstream side air-fuel ratio sensor.

As a result, correcting the upstream side estimated air-fuel ratio corresponding value using the value obtained by high-pass filter processing the output value of the upstream side air-fuel ratio sensor enables that upstream side estimated air-fuel ratio corresponding value to be corrected so that the temporary error it contains is reduced without it being affected by the manner of gas contact or the composition of the gas.

According to this structure, the temporary error in the estimated upstream side estimated air-fuel ratio corresponding value can be reduced so even if the air-fuel ratio temporarily changes, appropriate feedback control is maintained by air-fuel ratio feedback control that is based on the corrected upstream side estimated air-fuel ratio corresponding value. In addition, when the air-fuel ratio control device performs air-fuel ratio feedback control based on not only the corrected upstream side estimated air-fuel ratio corresponding value but also the output value of the downstream side air-fuel ratio sensor, the air-fuel ratio feedback control that is based on the output value of the downstream side air-fuel ratio sensor is able to compensate for the constant error in the upstream side estimated air-fuel ratio corresponding value.

Furthermore, because the value obtained from high-pass filter processing the output value of the upstream side air-fuel ratio sensor, not that output value itself, is used in the air-fuel ratio feedback control, an inexpensive limiting current oxygen content sensor in which constant error (and thus error that can be removed by the high-pass filtering process) tends to occur in the output value can be used for the upstream side air-fuel ratio sensor. As a result, it is possible to suppress an increase in manufacturing costs with respect to the air-fuel ratio control apparatus according to the first aspect in which the upstream side air-fuel ratio sensor is not necessary.

In the air-fuel ratio control apparatus according to the second aspect, the correcting device is preferably structured to correct the estimated upstream side estimated air-fuel ratio corresponding value based on the difference between the value obtained by high-pass filter processing the output value of the upstream side air-fuel ratio sensor and a value obtained by high-pass filter processing the upstream side estimated air-fuel ratio corresponding value (hereinafter that difference will be referred to as the high-pass filtering process value difference). This high-pass filtering process value difference can be a value which accurately indicates the temporary error in the upstream side estimated air-fuel ratio corresponding value because it is the difference between two values that fluctuate with only the high frequency component. Therefore, according to this structure, the upstream side estimated air-fuel ratio corresponding value can be corrected so that the temporary error in that upstream side estimated air-fuel ratio corresponding value is reduced even more.

In this case, the correcting device may be structured to use, as the value obtained by high-pass filter processing the upstream side estimated air-fuel ratio corresponding value, the value obtained by high-pass filter processing the upstream side estimated air-fuel ratio corresponding value that was estimated a predetermined period of time (hereinafter referred to as "lag time") before the current time, the predetermined period of time or lag time being the period of time that it takes from the time gas is discharged from the combustion chamber into the exhaust passage until the air-fuel ratio of the discharged gas is expressed as the output value of the upstream side air-fuel ratio sensor (and to use the value obtained by high-pass filter processing the output value of the upstream side air-fuel ratio sensor at the current time as the value obtained by high-pass filter processing the output value of the upstream side air-fuel ratio sensor).

Accordingly, the upstream side estimated air-fuel ratio corresponding value is a value indicative of the air-fuel ratio of the gas discharged from the combustion chamber into the exhaust passage. Therefore, it takes the foregoing lag time from the time gas having an air-fuel ratio of the upstream side estimated air-fuel ratio corresponding value is discharged from the combustion chamber into the exhaust passage until the air-fuel ratio of that gas (i.e., the air-fuel ratio indicated by the upstream side estimated air-fuel ratio corresponding value) is expressed as the output value of the upstream side air-fuel ratio sensor. In other words, the output value of the upstream side air-fuel ratio sensor is a value indicative of the air-fuel ratio of the gas discharged from the combustion chamber into the exhaust passage a predetermined period of time (i.e., the lag time) before the current time.

Therefore, with this structure, the high-pass filtering process value difference can be made the difference between two values indicative of the same gas air-fuel ratio so the high-pass filtering process value difference can be calculated as a value that more accurately indicates the temporary error in the upstream side estimated air-fuel ratio corresponding value. Accordingly, the upstream side estimated air-fuel ratio corresponding value can be corrected to further reduce the temporary error that it contains.

Moreover, the correcting device is preferably structured to correct the estimated upstream side estimated air-fuel ratio corresponding value based also on the output value of the downstream side air-fuel ratio sensor. According to this structure, the upstream side estimated air-fuel ratio corresponding value can be corrected (i.e., offset-corrected) to also reduce the constant error that it contains. Therefore, the upstream side estimated air-fuel ratio corresponding value becomes a value that more accurately indicates the air-fuel ratio of the gas discharged from the combustion chamber into the exhaust passage so the air-fuel ratio can be more appropriately feedback controlled based on the upstream side estimated air-fuel ratio corresponding value.

A third aspect of the invention relates to an air-fuel ratio control method of an internal combustion engine, which includes the steps of estimating a catalyst upstream side estimated air-fuel ratio corresponding value which corresponds to an air-fuel ratio of gas discharged from a combustion chamber of the internal combustion engine into an exhaust passage based on an operating state of the internal combustion engine and a combustion state of the internal combustion engine, and controlling the air-fuel ratio of gas flowing into a catalyst based on the estimated upstream side estimated air-fuel ratio corresponding value and an output value of a downstream side air-fuel ratio sensor.

A fourth aspect of the invention relates to an air-fuel ratio control method of an internal combustion engine, which includes the steps of estimating a catalyst upstream side estimated air-fuel ratio corresponding value which corresponds to an air-fuel ratio of gas discharged from a combustion chamber of the internal combustion engine into an exhaust passage based on an operating state of the internal combustion engine and a combustion state of the internal combustion engine, correcting the estimated catalyst upstream side estimated air-fuel ratio corresponding value using a value obtained by high-pass filter processing an output value of a catalyst upstream side air-fuel ratio sensor, and controlling an air-fuel ratio of gas flowing into the catalyst based on the corrected catalyst upstream side estimated air-fuel ratio corresponding value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, various example embodiments of an air-fuel ratio control apparatus of an internal combustion engine according to the invention will be described with reference to the accompanying drawings. This air-fuel ratio control apparatus is also a fuel injection quantity control apparatus that controls a fuel injection quantity of the engine.

First Example Embodiment

Figure 1:
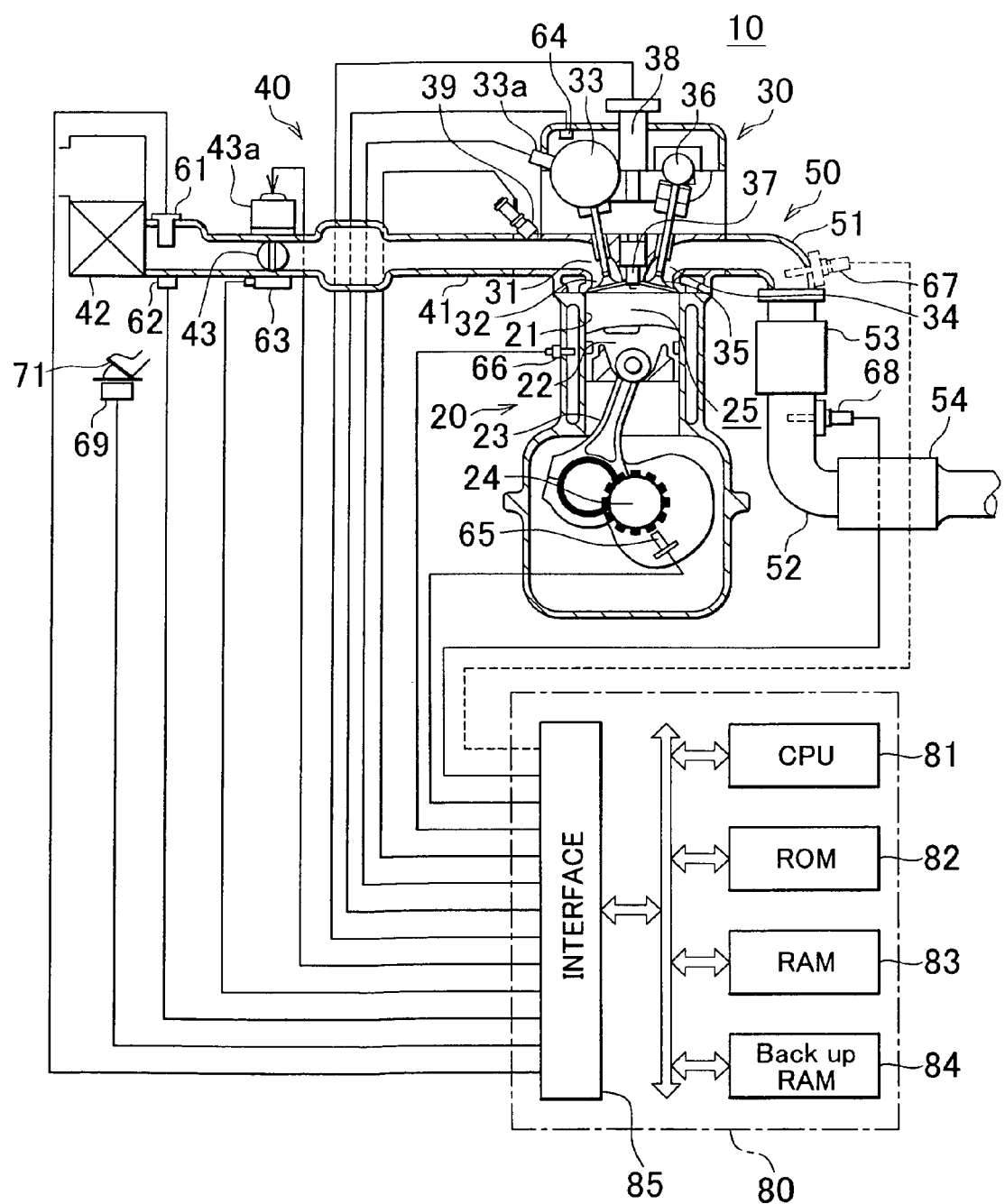
FIG. 1 is a diagram schematically showing an air-fuel ratio control apparatus (i.e., a fuel injection quantity control apparatus) according to a first example embodiment of the invention which has been applied to an internal combustion engine.

FIG. 1 is a block diagram schematically showing a system in which an air-fuel ratio control apparatus according to a first example embodiment of the invention has been applied to a four-cycle spark ignition multiple cylinder internal combustion engine 10. Although FIG. 1 shows a cross-section of only one cylinder, the other cylinders have the same structure.

This internal combustion engine 10 includes a cylinder block, a cylinder block portion 20 that includes a cylinder block lower case and an oil pan and the like, a cylinder head portion 30 which is fixed to the top of the cylinder block portion 20, an intake system 40 for supplying a gasoline air-fuel mixture to the cylinder block portion 20, and an exhaust system 50 for discharging exhaust gas from the cylinder block portion 20 outside.

The cylinder block portion 20 includes a cylinder 21, a piston 22, a connecting rod 23, and a crankshaft 24. The piston 22 moves back and forth inside the cylinder 21. This reciprocal movement of the piston 22 is transmitted to the crankshaft 24 via the connecting rod 23 and causes the crankshaft 24 to rotate. The cylinder 21 and the head of the piston 22, together with the cylinder head portion 30, define a combustion chamber 25.

The cylinder head portion 30 includes an intake port 31 that is communicated with the combustion chamber 25, an intake valve 32 that opens and closes the intake port 31, a variable intake valve timing apparatus 33 which has an intake cam shaft that drives the intake valve 32 and which continuously changes the lift amount and phase angle of that intake cam shaft, an actuator 33a of the variable intake timing apparatus 33, an exhaust port 34 which is communicated with the combustion chamber 25, an exhaust valve 35 that opens and closes the exhaust port 34, an exhaust cam shaft 36 that drives the exhaust valve 35, a spark plug 37, an igniter 38 that includes an ignition coil which generates high voltage that is applied to the spark plug 37, and an injector 39 (i.e., fuel injecting device) for injecting fuel into the intake port 31.

The intake system 40 includes an intake pipe 41 that has an intake manifold which is communicated with the intake port 31 and forms an intake passage with that intake port 31, an air filter 42 provided at an end portion of the intake pipe 41, and a throttle valve 43 which is provided inside the intake pipe 41 and which can vary the sectional area of the opening of the intake passage. The throttle valve 43 is rotatably driven in the intake pipe 41 by a DC motor which serves as a throttle valve actuator 43a.

The exhaust system 50 includes an exhaust manifold 51 which is communicated with the exhaust port 34, an exhaust pipe 52 which is connected to the exhaust manifold 51, an upstream side catalyst 53 arranged in the exhaust pipe 52, and a downstream side catalyst 54 arranged farther downstream than the upstream side catalyst 53 in the exhaust pipe 52. The exhaust port 34, the exhaust manifold 51, and the exhaust pipe 52 together form an exhaust passage.

The upstream side catalyst 53 and the downstream side catalyst 54 are both so-called three-way catalyst devices that carry an active component of a precious metal such as platinum. These catalysts function to oxidize unburned gas such as HC and CO as well as reduce nitrogen oxide (NOX) when the gas flowing into the catalyst (hereinafter referred to as "catalyst inflow gas") is substantially the stoichiometric air-fuel ratio. Further, these catalysts also have the oxygen storage function described above in which they store (i.e., absorb) oxygen. This oxygen storage function enables the catalysts to purify unburned gas and nitrogen oxide even when the air-fuel ratio shifts away from the stoichiometric air-fuel ratio. This oxygen storage function is produced by ceria ($CeO_2$) carried on the catalysts.

Meanwhile, this system also includes a hot-wire air flow meter 61, an intake air temperature sensor 62, a throttle position sensor 63, a cam position sensor 64, a crank position sensor 65, a coolant temperature sensor 66, an oxygen content sensor 68 (i.e., the downstream side air-fuel ratio sensor), and an accelerator opening amount sensor 69.

The air flow meter 61 outputs a signal indicative of a mass flowrate (i.e., intake air flowrate) Ga of intake air flowing in the intake pipe 41. The intake air temperature sensor 62 detects the temperature of the intake air and outputs a signal indicative of an intake air temperature THA. The throttle position sensor 63 detects an opening amount of the throttle valve 43 (i.e., the throttle valve opening amount) and outputs a signal indicative of a throttle valve opening amount TA.

The cam position sensor 64 generates a signal (G2 signal) having a single pulse every time the intake camshaft rotates 90 degrees (i.e., every time the crankshaft 24 rotates 180 degrees). The crankshaft position sensor 65 outputs a signal that has a narrow pulse every time the crankshaft 24 rotates 10 degrees and has a wide pulse every time the crankshaft 24 rotates 360 degrees. This signal indicates an engine speed NE. The coolant temperature sensor 66 detects the temperature of coolant in the internal combustion engine 10 and outputs a signal indicative of a coolant temperature THW.

The oxygen content sensor 68 is arranged on the downstream side of the upstream side catalyst 53 and on the upstream side of the downstream side catalyst 54 in the exhaust passage. The oxygen content sensor 68 is a solid electrolyte sensor (i.e., a well known concentration cell oxygen content sensor that uses stabilized zirconia).

Figure 2:
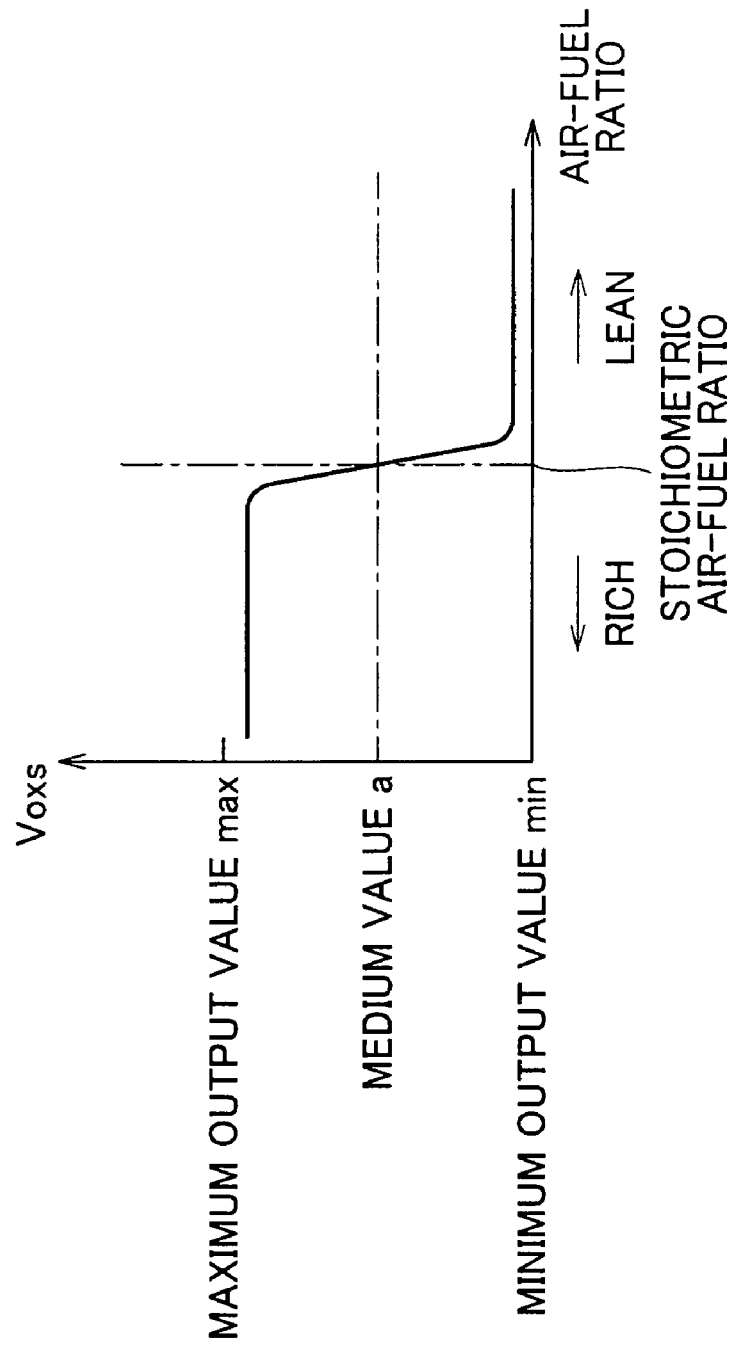
FIG. 2 is a graph showing the relationship between the air-fuel ratio and output of an oxygen content sensor which is a downstream side air-fuel ratio sensor shown in FIG. 1.

As shown in FIG. 2, the oxygen content sensor 68 outputs a maximum output value max when the detected gas air-fuel ratio is richer than the stoichiometric air-fuel ratio, outputs a minimum output value min when the detected gas air-fuel ratio is leaner than the stoichiometric air-fuel ratio, and outputs a value substantially between the maximum output value max and the minimum output value min (i.e., outputs a medium value a) when the detected gas air-fuel ratio is equal to the stoichiometric air-fuel ratio.

The accelerator opening amount sensor 69 outputs a signal indicative of an operating amount Accp of an accelerator pedal 71 which is operated by a driver.

An electronic control unit 80 is a microcomputer which includes a CPU 81, ROM 82 in which programs to be executed by the CPU 81, tables (maps and functions), constants, and the like are stored in advance, RAM 83 that temporarily stores data as required by the CPU 81, backup RAM 84 that stores data when supplied with electricity and which retains that stored data even while the supply of electricity is cutoff, and an interface 85 including an AD converter, and the like, all of which are connected together by a bus.

The interface 85 is connected to the sensors 61 to 66, 68, and 69, supplies signals from those sensors 61 to 66, 68, and 69 to the CPU 81, and outputs drive signals to the actuator 33a of the variable intake timing apparatus 33, the igniter 38, an injector 39, and a throttle valve actuator 43a according to commands from the CPU 81.

(Outline of Air-Fuel Ratio Feedback Control)

Next, an outline of air-fuel ratio feedback control according to the air-fuel ratio control apparatus according to the first example embodiment having the structure described above (hereinafter also referred to as "this apparatus") will be described. This apparatus controls the air-fuel ratio of the air-fuel mixture supplied to the engine (and thus the air-fuel ratio of the gas flowing into the upstream side catalyst 53; hereinafter also referred to as the "air-fuel ratio of the engine") so that the air-fuel ratio of gas flowing out from the upstream side catalyst 53 becomes the stoichiometric air-fuel ratio.

More specifically, this apparatus feedback controls the air-fuel ratio of the engine so that an output Voxs of the oxygen content sensor 68 that is arranged downstream of the upstream side catalyst 53 becomes equal to a target value Voxsref (in this example, see FIG. 2 and the medium value a) that corresponds to the stoichiometric air-fuel ratio based on the output Voxs of the oxygen content sensor 68 and an estimated air-fuel ratio AFest (the upstream side estimated air-fuel ratio corresponding value) which is an estimated value of the air-fuel ratio of the gas discharged from the combustion chamber 25 into the exhaust passage that is successively calculated as will be described later. The air-fuel ratio feedback control that is based on the output Voxs of the oxygen content sensor 68 is also referred to as "sub-feedback control".

(Actual Operation)

Next, the actual operation of the air-fuel ratio control apparatus according to the first example embodiment having the foregoing structure will be described with reference to FIGS. 3 to 6 in which routines (i.e., programs) executed by the CPU 81 of the electronic control apparatus 80 are illustrated with flowcharts. The routine shown in FIG. 3 corresponds to air-fuel ratio controlling device which controls the air-fuel ratio of gas flowing into the upstream side catalyst 53 based on the upstream side estimated air-fuel ratio corresponding value (i.e., the estimated air-fuel ratio AFest) and the output value of the downstream side air-fuel ratio sensor (i.e., the output Voxs of the oxygen content sensor 68). The routine shown in FIG. 4 corresponds to catalyst upstream air-fuel ratio estimating device which estimates the upstream side estimated air-fuel ratio corresponding value (i.e., the estimated air-fuel ratio AFest).

Figure 3:
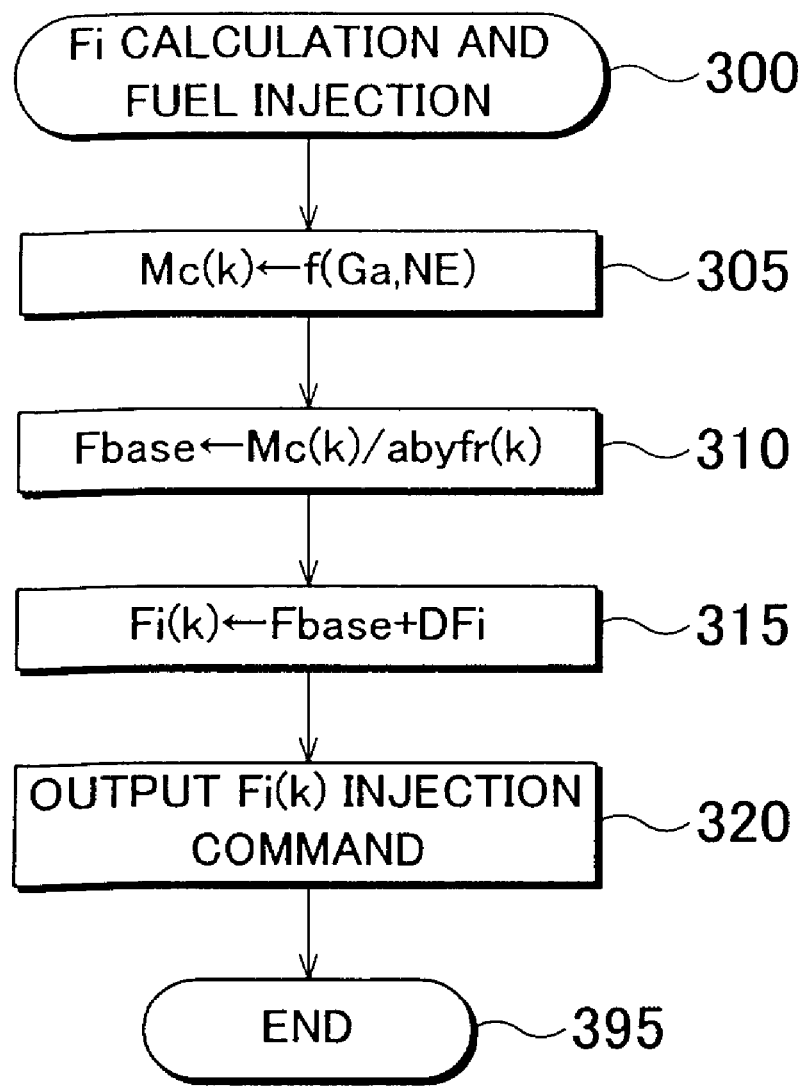
FIG. 3 is a flowchart illustrating a fuel injection control routine executed by a CPU shown in FIG. 1.

The CPU 81 repeatedly executes the routine for calculating the fuel injection quantity Fi and issuing a fuel injection command shown in FIG. 3 in each cylinder every time the crank angle for a cylinder reaches a predetermined crank angle (such as BTDC 90 degrees CA) before top dead center on the intake stroke. Accordingly, when the crank angle for a given cylinder reaches the predetermined crank angle, the CPU 81 starts the routine from step 300 and then proceeds on to step 305 where it obtains an in-cylinder intake air quantity Mc(k), which is the amount of air drawn into the combustion chamber 25 during the intake stroke, from a map f based on the engine speed NE and the intake air flowrate Ga measured by the air flow meter 61. This map f is stored in the ROM 82 in advance. The suffix (k) indicates a value with respect to the current intake stroke (the same also applies for other variables).

Next, the CPU 81 proceeds on to step 310 where it obtains a base fuel injection quantity Fbase which is a fuel quantity for making the air-fuel ratio of the engine a target air-fuel ratio abyfr(k) by dividing the in-cylinder intake air quantity Mc(k) by the target air-fuel ratio abyfr(k) (which is normally equal to the stoichiometric air-fuel ratio). The CPU 81 then continues on to step 315 where it sets a fuel injection quantity Fi(k) to the sum of the obtained base fuel injection quantity Fbase plus (the latest value of) an air-fuel ratio feedback correction quantity DFi which will be described later.

The CPU 81 then proceeds on to step 320 where it outputs a command to the injector 39 corresponding to the given cylinder to inject fuel of the fuel injection quantity Fi, after which the routine ends in step 395. As a result, fuel of the fuel injection quantity Fi that was feedback corrected is injected into the cylinder that is approaching the intake stroke. This routine is executed in the same way for the other cylinders as well.

Next, the calculation of the estimated air-fuel ratio AFest which is the upstream side estimated air-fuel ratio corresponding value will be described. The CPU 81 repeatedly executes the routine shown in FIG. 4 for each cylinder in synchronization with the execution of the routine in FIG. 3. Accordingly, at a predetermined timing, the CPU 81 starts the routine from step 400 and then proceeds on to step 405 where it determines whether an air-fuel ratio feedback control condition is satisfied. If the determination is "No", then the process proceeds directly to step 495 and the routine ends. Therefore, if the air-fuel ratio feedback control condition is not satisfied, an estimated air-fuel ratio AFest(k) is not calculated and updated. The air-fuel ratio feedback control condition is satisfied when, for example, the coolant temperature THW of the engine detected by the coolant temperature sensor 66 is equal to or greater than a first predetermined temperature, and the intake air quantity (load) per one revolution of the engine is equal to or less than a predetermined value.

Supposing now that the air-fuel ratio feedback control condition is satisfied, the determination in step 405 is "Yes" so the CPU 81 proceeds on to step 410 where it obtains the in-cylinder intake air quantity Mc(k) obtained earlier in step 305 and the fuel injection quantity Fi(k) obtained earlier in step 315.

The CPU 81 then continues on to step 415 where it obtains a combustion rate coefficient T based on the engine speed NE, the in-cylinder intake air quantity Mc(k), the coolant temperature THW obtained by the coolant sensor 66, and a function FuncT that is the argument of those values. The combustion rate coefficient T is a parameter that changes depending on the degree of misfire in the combustion chamber 25, and is a coefficient equal to or greater than "0" and equal to or less than "1" which decreases as the degree of misfire in the combustion chamber 25 increases. T=1 corresponds to complete combustion and T=0 corresponds to a complete misfire.

Therefore, the combustion rate coefficient T becomes a smaller value the lower the engine speed NE, the lower the in-cylinder intake air quantity Mc(k), and the lower the coolant temperature THW (and thus the lower the temperature of the wall surface of the combustion chamber 25). This is based on the tendency for the degree of misfire in the combustion chamber 25 to increase the lower the engine speed NE, the lower the in-cylinder intake air quantity Mc(k), and the lower the temperature of the wall surface of the combustion temperature 25. In this way, the combustion rate coefficient T is a value indicative of the combustion state of the engine.

Next, the CPU 81 proceeds on to step 420 where it first obtains the air-fuel ratio obtained from the operating state of the engine, which is obtained by dividing the in-cylinder intake air quantity Mc(k) that was obtained in step 410 by the fuel injection quantity Fi(k) that was also obtained in step 410, and then obtains the estimated air-fuel ratio AFest(k) by multiplying this air-fuel ratio by the combustion rate coefficient T. The process then proceeds on to step 495 and the routine ends.

As a result, the estimated air-fuel ratio AFest(k) becomes a smaller value (i.e., the air-fuel ratio becomes richer) the greater the degree of misfire in the combustion chamber 25. This relationship follows the tendency of the substantive air-fuel ratio of the gas discharged from the combustion chamber 25 to the exhaust passage to become richer from more unburned fuel being discharged into the exhaust passage the greater the degree of misfire in the combustion chamber 25. In this way, the estimated air-fuel ratio AFest(k) is calculated as an estimated value of the air-fuel ratio of the gas that is discharged from the combustion chamber 25 into the exhaust passage based on the operating state of the engine and the combustion state of the engine.

Next, the calculation of the air-fuel ratio feedback correction quantity DFi will be described. The CPU 81 repeatedly executes the routine shown in FIG. 5 for each cylinder in synchronization with the execution of the routine in FIG. 3. Accordingly, at a predetermined timing, the CPU 81 starts the routine from step 500 and then proceeds on to step 505 where it determines whether the same air-fuel ratio feedback control condition as in step 405 earlier is satisfied.

Supposing now the air-fuel ratio feedback control condition is satisfied, the determination in step 505 is "Yes" so the CPU 81 proceeds on to step 510 where it obtains an air-fuel ratio upstream of the upstream side catalyst 53 by adding a value (=K1×vafsfb) which is the product of a sub-feedback control amount vafsfb, which will be described later, multiplied by a coefficient K1 (a positive constant) to the estimated air-fuel ratio AFest(k) this time (i.e., with respect to the current intake stroke) that is obtained in step 420 earlier. This air-fuel ratio is a "superficial air-fuel ratio" of gas upstream of the upstream side catalyst 53 and will hereinafter be referred to as "upstream side control air-fuel ratio abyfs".

Next, the CPU 81 proceeds on to step 515 where it obtains a current in-cylinder fuel supply amount Fc(k) by dividing the current in-cylinder intake air quantity Mc(k) obtained in step 306 earlier by the obtained upstream side control air-fuel ratio abyfs.

The CPU 81 then proceeds on to step 520 where it obtains a current target in-cylinder fuel supply quantity Fcr(k) by dividing the current in-cylinder intake air quantity Mc(k) by the current target air-fuel ratio abyfr(k) that was used in step 310 earlier (i.e., by the stoichiometric air-fuel ratio in this example).

Next, the CPU 81 proceeds on to step 525 where it sets an in-cylinder fuel supply amount difference DFc as the difference between the current target in-cylinder fuel supply amount Fcr(k) minus the current in-cylinder fuel supply amount Fc(k). That is, the in-cylinder fuel supply amount difference DFc is an amount indicative of the excess or insufficiency of fuel supplied into the cylinder at the current time. Next, the CPU 81 proceeds on to step 530 where it obtains the air-fuel ratio feedback correction quantity Dfi based on Expression (1) below.

$$Dfi = (Gp \times DFc + Gi \times SDFc) \times KFB \quad (1)$$

In Expression (1) above, Gp is the proportional gain set beforehand and Gi is the integral gain set beforehand. The coefficient KFB in Expression (1) preferably varies depending on the engine speed NE and the in-cylinder intake air quantity Mc and the like, but in this example it is "1". Also, the value SDFc is an integral value of the in-cylinder fuel supply amount difference DFc and is updated in the next step, step 535.

That is, the CPU 81 obtains a new integral value SDFc of the in-cylinder fuel supply amount difference by adding the in-cylinder fuel supply amount difference DFc that was obtained in step 525 to the integral value SDFc of the in-cylinder fuel supply amount difference DFc at that time in step 535. The routine then ends in step 595.

As a result, the air-fuel ratio feedback correction quantity DFi is obtained through proportional-plus-integral processing and this air-fuel ratio feedback correction quantity DFi is reflected in the fuel injection quantity Fi(k) through steps 315 and 320 earlier on, which compensates for the excess or insufficiency of the fuel supply amount at the current time. As a result, the average value of the air-fuel ratio of the engine (and thus the air-fuel ratio of gas flowing into the upstream side catalyst 53) is made to substantially match the target air-fuel ratio abyfr (i.e., the stoichiometric air-fuel ratio).

On the other hand, if the air-fuel ratio feedback control condition is not satisfied at the time the determination in step 505 is made, the determination in that step is "No" and the CPU 81 proceeds on to step 540 where it sets the value of the air-fuel ratio feedback correction quantity DFi to "0" and then initializes the integral value SDFc of the in-cylinder fuel supply amount difference in step 545 to "0" in preparation to restart the air-fuel ratio feedback control. The process then proceeds on to step 595 where the routine ends. In this way, when the air-fuel ratio feedback control condition is not satisfied, the air-fuel ratio feedback correction quantity DFi is set to "0" so the air-fuel ratio (i.e., the base fuel injection quantity Fbase) is not corrected.

Next, the air-fuel ratio feedback control (i.e., sub-feedback control) that is based on the output Voxs of the oxygen content sensor 68 will be described. The sub-feedback control amount vafsfb described above is calculated according to this sub-feedback control.

Figure 6:
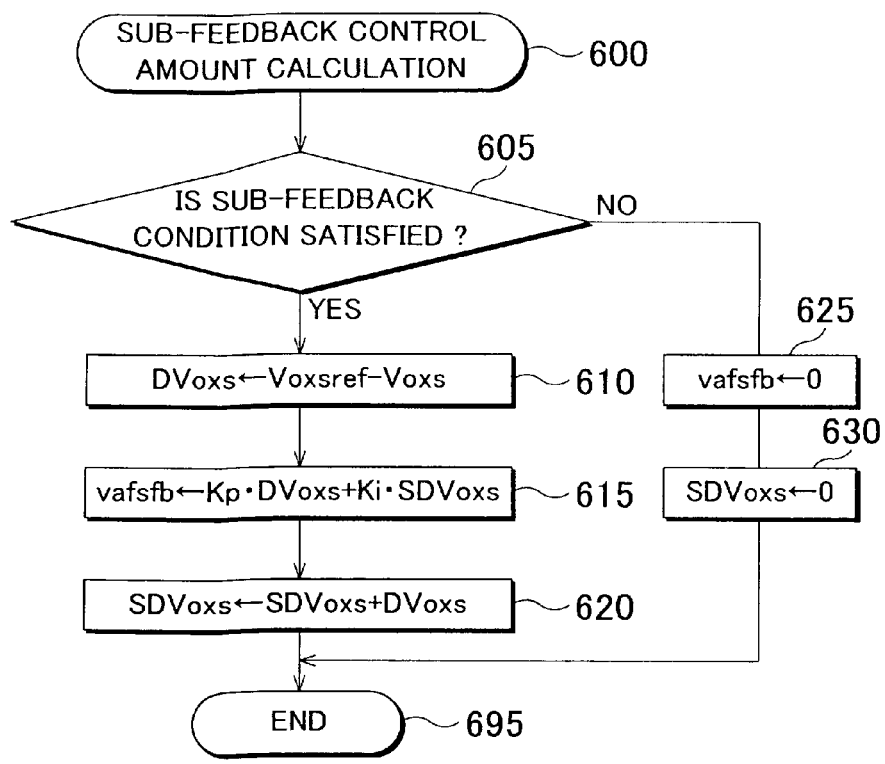
FIG. 6 is a flowchart illustrating a routine that the CPU shown in FIG. 1 executes to calculate a sub-feedback control amount.

In order to obtain the sub-feedback control amount vafsfb, the CPU 81 repeatedly executes the routine shown in FIG. 6 for each cylinder in synchronization with the execution of the routine in FIG. 3. Accordingly, at a predetermined timing, the CPU 81 starts the routine from step 600 and then proceeds on to step 605 where it determines whether a sub-feedback control condition is satisfied. The air-fuel ratio feedback control condition is satisfied when, for example, the air-fuel ratio feedback control condition in step 405 (and 505) described above is satisfied, the coolant temperature THW of the engine is equal to or greater than a second predetermined temperature which is higher than the first predetermined temperature, and the oxygen content sensor 68 is active.

Supposing now that the sub-feedback control condition is satisfied, the determination in step 605 is "Yes" so the CPU 81 proceeds on to step 610 where it obtains an output difference amount DVoxs by subtracting the current output Voxs of the oxygen content sensor 68 from the current target value Voxsref corresponding to the stoichiometric air-fuel ratio. Next, the CPU 81 proceeds on to step 615 where it obtains the sub-feedback control amount vafsfb based on Expression (2) below.

$$vafsfb = Kp \times Dvoxs + Ki \times SDVoxs \quad (2)$$

In Expression (2) above, Kp is the proportional gain set beforehand, and Ki is the integral gain that is also set beforehand. Also, SDVoxs is an integral value of the output difference amount DVoxs and is updated in the next step, step 620. That is, when the CPU 81 proceeds on to step 620, it obtains a new integral value SDVoxs of the output difference amount by adding the output difference amount DVoxs obtained in step 610 to the integral value SDVoxs of the output difference amount at that time. Then the process proceeds on to step 695 and the routine ends.

Figure 5:
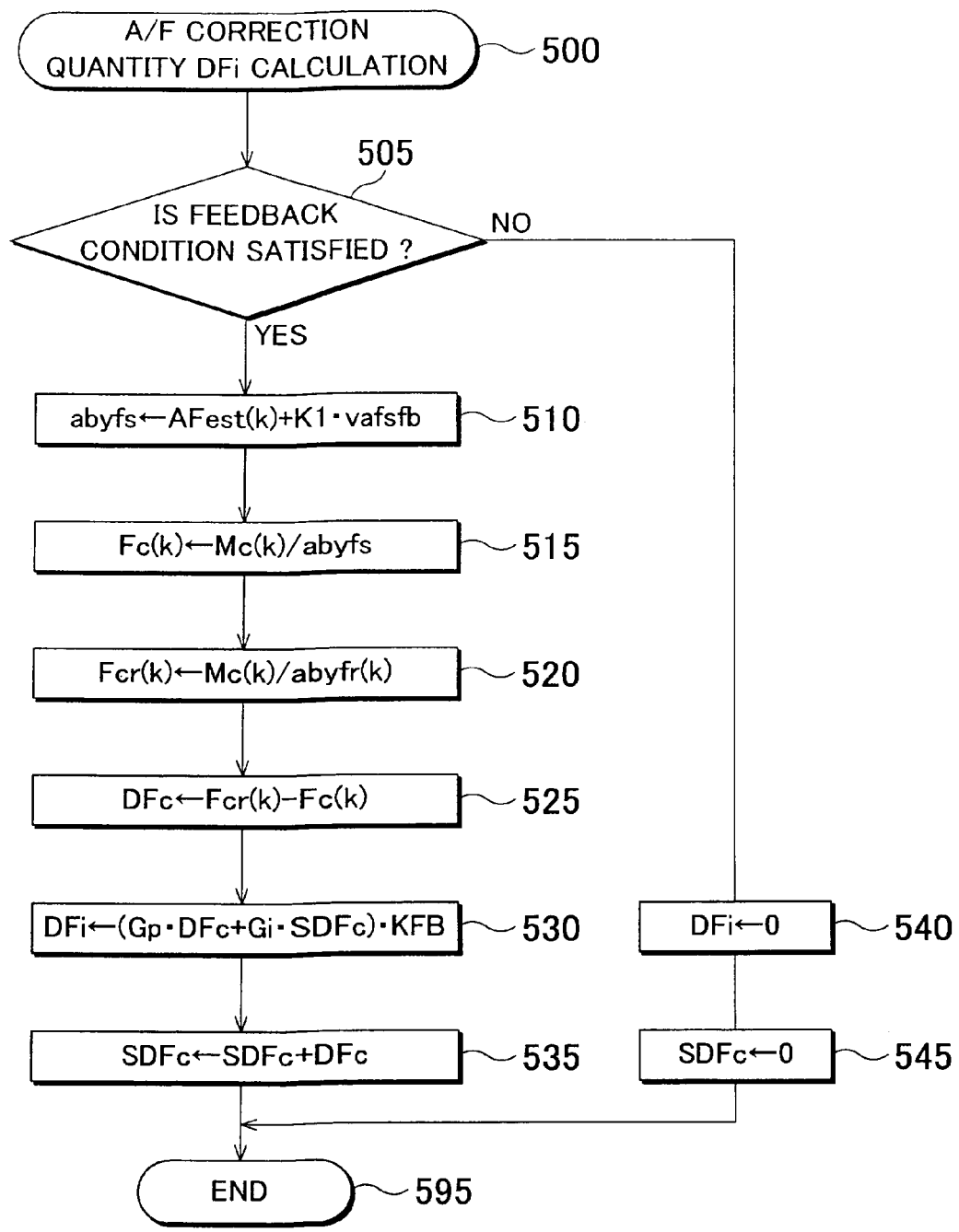
FIG. 5 is a flowchart illustrating a routine that the CPU shown in FIG. 1 executes to calculate an air-fuel ratio feedback correction quantity.

In this way, the upstream side control air-fuel ratio abyfs is calculated by obtaining the sub-feedback control amount vafsfb and adding the product of that sub-feedback control amount vafsfb multiplied by the coefficient K1 (=K1×vafsfb) to the value of the estimated air-fuel ratio AFest(k) in step 510 in FIG. 5 described above. In other words, the upstream side control air-fuel ratio abyfs is obtained as an air-fuel ratio that differs from the current estimated air-fuel ratio Afest(k) calculated in step 420 by an amount corresponding to the sub-feedback control amount vafsfb obtained based on the output Voxs of the oxygen content sensor 68.

As a result, the in-cylinder fuel supply amount Fc(k) calculated in step 505 in FIG. 5 described above changes according to the output Voxs of the oxygen content sensor 68 so the air-fuel ratio feedback correction quantity DFi is changed according to the oxygen content sensor 68 through steps 525 and 530. As a result, the air-fuel ratio of the engine is controlled so that the air-fuel ratio on the downstream side of the upstream side catalyst 53 matches the stoichiometric air-fuel ratio.

For example, if the output Voxs of the oxygen content sensor 68 is a value smaller than (i.e., a value on the lean side of) the value Voxsref corresponding to the stoichiometric air-fuel ratio, then the output difference amount DVoxs obtained in step 610 is a positive value so the sub-feedback control amount vafsfb obtained in step 615 is also a positive value. Accordingly, the upstream side control air-fuel ratio abyfs obtained in step 510 is obtained as a leaner value (i.e., a larger value) than the current estimated air-fuel ratio AFest(k).

Therefore, the in-cylinder fuel supply amount Fc(k) obtained in step 515 is a small value and the in-cylinder fuel supply amount difference DFc obtained in step 525 is a large value. Accordingly, the air-fuel ratio feedback correction quantity DFi is a large positive value. As a result, the fuel injection quantity Fi(k) obtained in step 315 in FIG. 3 is controlled so that it becomes larger than the base fuel injection quantity Fbase and the air-fuel ratio of the engine becomes rich.

If, on the other hand, the output Voxs of the oxygen content sensor 68 is a value larger than (i.e., a value on the rich side of) the value Voxsref corresponding to the stoichiometric air-fuel ratio due to the average air-fuel ratio of the engine being rich, then the output difference amount DVoxs is a negative value so the sub-feedback control amount vafsfb is also a negative value. Accordingly, the upstream side control air-fuel ratio abyfs obtained in step 510 is obtained as a richer value (i.e., a smaller value) than the current estimated air-fuel ratio AFest (k).

Accordingly, the in-cylinder supply amount Fc(k) becomes a large value so the in-cylinder fuel supply amount difference DFc is obtained as a negative value. As a result, the air-fuel ratio feedback correction quantity DFi is also a negative value. Accordingly, the fuel injection quantity Fi is controlled so that it becomes smaller than the base fuel injection quantity Fbase and the air-fuel ratio of the engine becomes lean.

Meanwhile, if the sub-feedback control condition is not satisfied, the determination in step 605 is "No" so the CPU 81 proceeds on to step 625 where it sets the value of the sub-feedback control amount vafsfb to "0". Then in step 630 the CPU 81 initializes the integral value SDVoxs of the output difference amount to "0" in preparation for restarting the sub-feedback control. The process then proceeds on to step 695 and the routine ends.

In this way, when the sub-feedback control condition is not satisfied, the sub-feedback control amount vafsfb is set to "0" so that the estimated air-fuel ratio AFest(k) is not corrected according to the output Voxs of the oxygen content sensor 68 (and thus the air-fuel ratio feedback correction quantity DFi is not corrected, i.e., the sub-feedback control is not performed).

As described above, with the air-fuel ratio control apparatus according to the first example embodiment of the invention, air-fuel ratio feedback control is executed based on the output Voxs of the oxygen content sensor 68 (and thus the sub-feedback control amount vafsfb) and the estimated air-fuel ratio AFest(k) which is the estimated value of the air-fuel ratio of gas discharged from the combustion chamber 25 to the exhaust passage (i.e., the upstream side estimated air-fuel ratio corresponding value). That is, with the air-fuel ratio control apparatus according to the first example embodiment of the invention, the air-fuel ratio sensor upstream of the upstream side catalyst 53 (i.e., the upstream side air-fuel ratio sensor) can be omitted from the structure of the apparatus, thereby enabling manufacturing costs of the apparatus on the whole to be reduced.

Also, because air-fuel ratio feedback control is not executed using the output value itself of the upstream side air-fuel ratio sensor, the problem of the air-fuel ratio not being appropriately feedback controlled due to the manner of gas contact or the gas composition will not occur.

Further, the estimated air-fuel ratio AFest(k) is able to be accurately estimated based on the operating state of the engine (i.e., the fuel injection quantity Fi(k) and the in-cylinder intake air quantity Mc(k)), and the combustion state in the engine (i.e., the combustion rate coefficient T), thus enabling appropriate feedback control to be performed on the air-fuel ratio based on the estimated air-fuel ratio AFest(k).

In addition, in the sub-feedback control which is air-fuel ratio feedback control that is based on the output Voxs of the oxygen content sensor 68 which is the downstream side air-fuel ratio sensor, the sub-feedback control amount vafsfb is calculated (see step 615) by executing proportional-plus-integral processing on the output difference amount DVoxs. That is, in the sub-feedback control, the output difference amount DVoxs in a steady state can be set to "0" because integral processing is performed on the output difference amount DVoxs. In other words, in a steady state, the air-fuel ratio downstream of the upstream side catalyst 53 can be maintained at the stoichiometric air-fuel ratio. Accordingly, the air-fuel ratio feedback control that is based on the sub-feedback control compensates for the constant error that may be in the estimated air-fuel ratio AFest(k).

Second Example Embodiment

Next, an air-fuel ratio control apparatus according to a second example embodiment of the invention will be described. This second example embodiment differs from the first example embodiment described above only in that i) it is applied to an internal combustion engine provided with an air-fuel ratio sensor 67 upstream of the upstream side catalyst 53 (see the air-fuel ratio sensor 67 shown by the broken line in FIG. 1), and ii) the air-fuel ratio feedback control uses, as the estimated air-fuel ratio AFest, a value that was corrected based on a value obtained by high-pass filter processing the (air-fuel ratio corresponding to the) output value of the air-fuel ratio sensor 67, and a value obtained by low-pass filter processing the (sub-feedback control amount vafsfb that is based on the) output Voxs of the oxygen content sensor 68. Therefore, the following description will focus on these points.

This air-fuel ratio sensor 67 is a so-called limiting current oxygen content sensor which detects the air-fuel ratio of gas discharged from the combustion chamber 25 into the exhaust passage and outputs a signal vabyfs indicative of the detected air-fuel ratio (i.e., an upstream side detected air-fuel ratio AFd). The output vabyfs of this air-fuel ratio sensor 67 (and therefore the upstream side detected air-fuel ratio AFd) may include error caused by the manner of gas contact or the gas composition.

The estimated air-fuel ratio AFest calculated in the first example embodiment described above is an estimated value so it of course includes error. In order to effectively reduce the error in this estimated air-fuel ratio AFest and appropriately execute air-fuel ratio feedback control, the second example embodiment is such that this estimated air-fuel ratio AFest is obtained as a pre-correction estimated air-fuel ratio AFestb, and the estimated air-fuel ratio AFest used in the air-fuel ratio feedback control is then obtained by correcting that pre-correction estimated air-fuel ratio AFestb in the manner described below. Hereinafter, the correction of the pre-correction estimated air-fuel ratio AFestb will be described with reference to the flowcharts.

(Actual Operation of the Second Example Embodiment)

Hereinafter, the actual operation of the air-fuel ratio control apparatus according to the second example embodiment will be described. The CPU 81 of this apparatus executes the routine shown in FIG. 3 as it is, from amount the routines shown in FIGS. 3 to 6 which are executed by the CPU 81 in the first example embodiment. Meanwhile, the CPU 81 of this apparatus executes each of the routines shown in the flowcharts of FIGS. 8 to 10 instead of the routines shown in FIGS. 4 to 6 which are executed by the CPU 81 in the first example embodiment. Hereinafter, the routines shown in FIGS. 8 to 10, which are unique to the second example embodiment, will be described.

Figure 4:
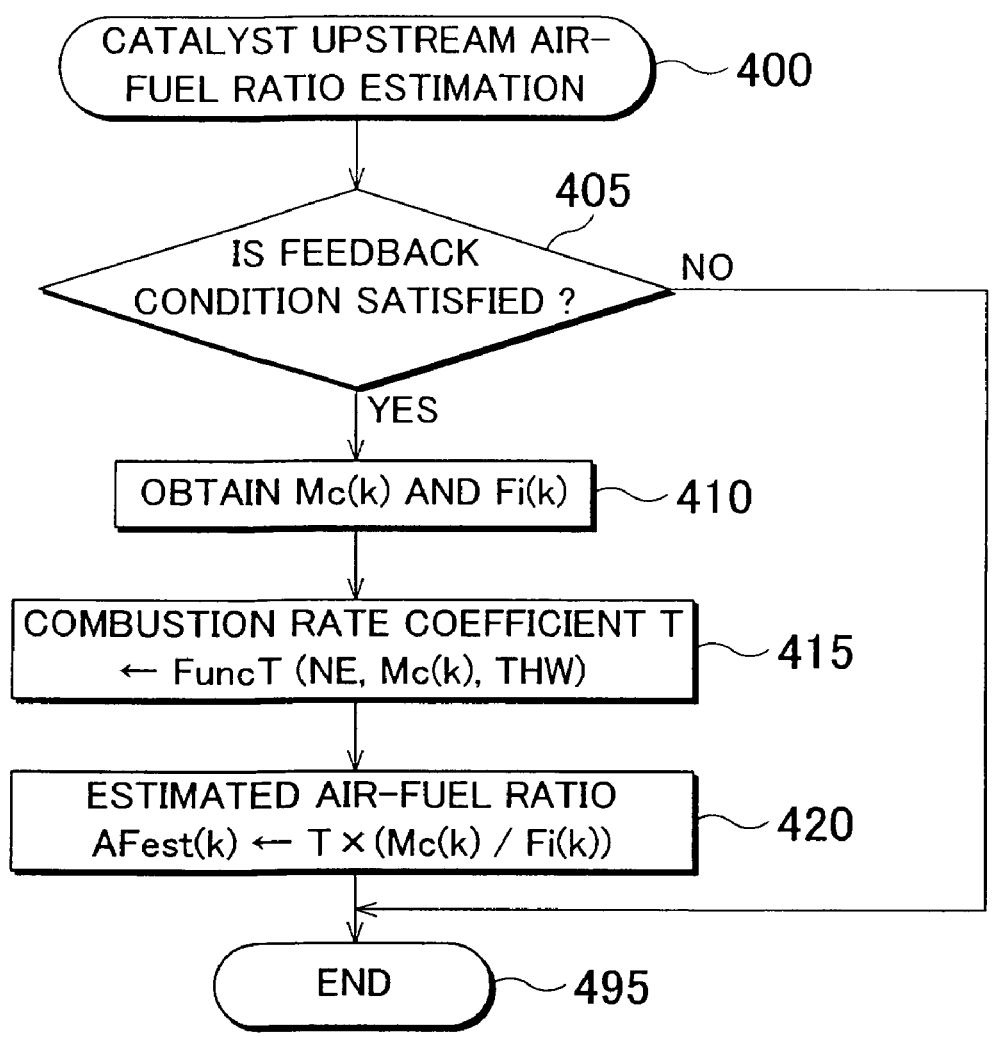
FIG. 4 is a flowchart illustrating a routine that the CPU shown in FIG. 1 executes to estimate a catalyst upstream air-fuel ratio.
Figure 8:
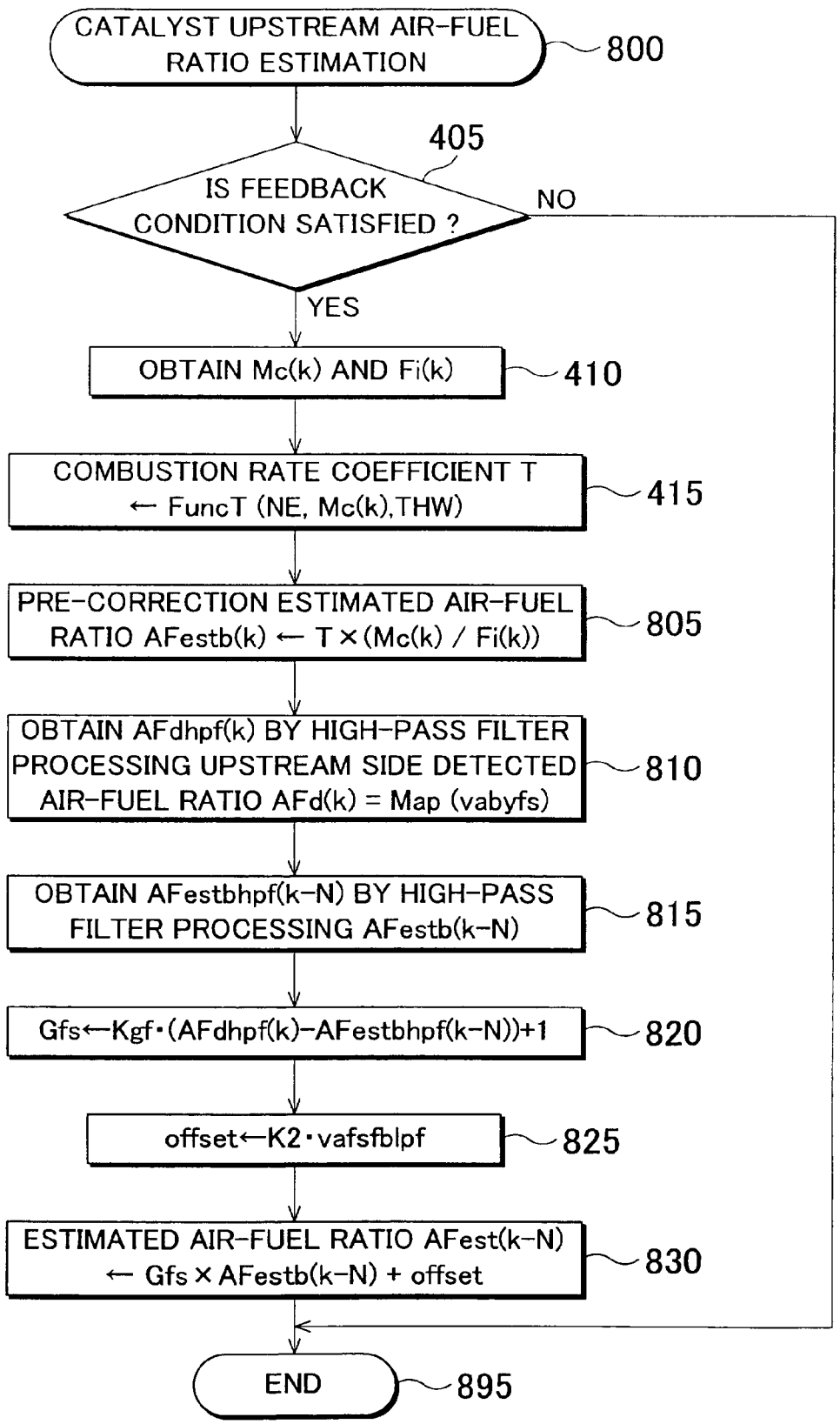
FIG. 8 is a flowchart illustrating a routine that the CPU of the air-fuel ratio control apparatus according to the second example embodiment of the invention executes to estimate the catalyst upstream air-fuel ratio.

The CPU 81 of this apparatus repeatedly executes the routine for calculating the estimated air-fuel ratio AFest shown in FIG. 8 which corresponds to the routine shown in FIG. 4 in the first example embodiment for each cylinder in synchronization with the execution of the routine shown in FIG. 3, just like the routine shown in FIG. 4. The steps in the routine shown in FIG. 8 that are the same as the steps in FIG. 4 will be denoted by the same step numbers as those in FIG. 4. Descriptions thereof would be redundant and so will be omitted here (the same applies to the relationship between the routine shown in FIG. 9, which will be described later, and the routine shown in FIG. 5, as well as the relationship between the routine shown in FIG. 10, which will be described later, and the routine shown in FIG. 6).

The routine shown in FIG. 8 differs from the routine shown in FIG. 4 only in that i) the estimated air-fuel ratio Afest(k) calculated in step 420 in FIG. 4 is obtained as the pre-correction estimated air-fuel ratio AFestb(k) in step 805, and ii) steps 810 to 830 have been added to obtain the estimated air-fuel ratio AFest by correcting the pre-correction estimated air-fuel ratio AFestb. Here, steps 810 to 830 correspond to correcting device.

Figure 7:
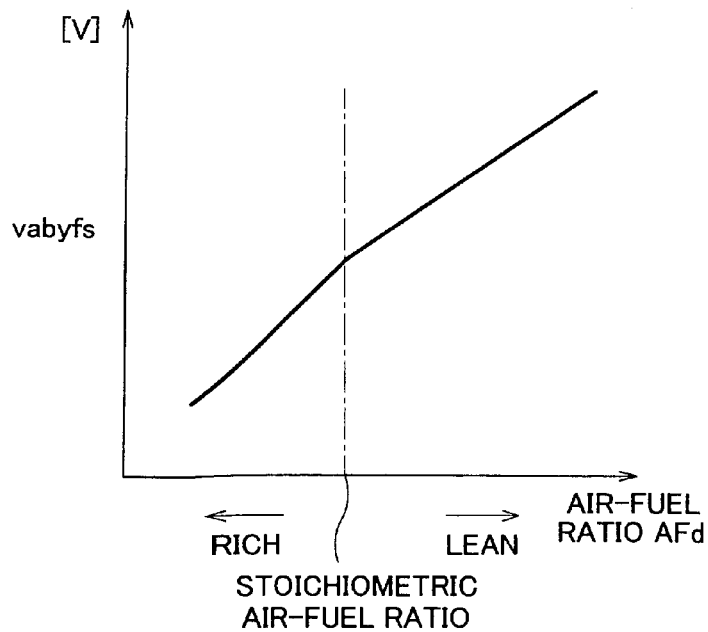
FIG. 7 is a graph showing the relationship between the air-fuel ratio and output of an upstream side air-fuel ratio sensor shown in FIG. 1 which is referenced by a CPU of an air-fuel ratio control apparatus according to a second example embodiment of the invention.

In step 810, an upstream side detected air-fuel ratio AFdhpf (k) after high-pass filter processing (hereinafter referred to as "high-pass filtered upstream side detected air-fuel ratio AFdhpf(k)") at the current time is obtained by high-pass filter processing the current upstream detected air-fuel ratio AFd (k) obtained from the current output vabyfs of the air-fuel ratio sensor 67 and the map shown in FIG. 7. This high-pass filtered upstream side detected air-fuel ratio AFdhpf(k) corresponds to a value obtained by high-pass filter processing the output value of the upstream side air-fuel ratio sensor.

Here, the error in the output vabyfs of the air-fuel ratio sensor 67 that depends on the manner of gas contact and the gas composition, as described above, tends to appear as a relatively constant error. Accordingly, the value of the high-pass filtered upstream side detected air-fuel ratio AFdhpf(k) is a value which excludes the error of the output vabyfs of the upstream side air-fuel ratio sensor 67 that depends on the manner of gas contact and the gas composition. On the other hand, the amount of change in the output vabyfs of the upstream side air-fuel ratio sensor 67 that occurs from a temporary change in the air-fuel ratio can appear as a change in the value of the high-pass filtered upstream side detected air-fuel ratio AFdhpf(k).

In step 815, a high-pass filtered pre-correction estimated air-fuel ratio AFestbhpf(k−N) N strokes (N being the number of intake strokes) before the current point is obtained by high-pass filter processing the pre-correction estimated air-fuel ratio AFestb(k−N) for the intake stroke N strokes before the current point. The (digital) high-pass filter used for the high-pass filtering process has the same characteristic as the (digital) high-pass filter used in the high-pass filtering process in step 810 described above. This high-pass filtered pre-correction estimated air-fuel ratio AFestbhpf(k−N) corresponds to a value obtained from high-pass filter processing the upstream side estimated air-fuel ratio corresponding value.

This value N is the number of strokes corresponding to the amount of time it takes (i.e., the lag time) from the time gas is discharged from the combustion chamber 25 into the exhaust passage until the air-fuel ratio of that discharged gas appears as the output vabyfs of the air-fuel ratio sensor 67. Here, the lag time changes according to the engine speed NE, the in-cylinder intake air quantity Mc(k) and the like so the value N can be obtained using, for example, a table or the like in which the engine speed NE, the in-cylinder intake air quantity Mc(k) and the like are arguments.

In step 820, a correction coefficient Gfs used to correct the pre-correction estimated air-fuel ratio AFestb is set as a value equal to the product of a predetermined gain Kgf (a positive constant value) multiplied by the difference of the high-pass filtered upstream side detected air-fuel ratio AFdhpf(k) minus the high-pass filtered pre-correction estimated air-fuel ratio AFestbhpf(k−N) (i.e., the high-pass filtering process value difference) plus "1". Accordingly, the correction coefficient Gfs is set to a value which changes around "1".

The reason why the difference between the current high-pass filtered upstream side detected air-fuel ratio AFdhpf(k) and the high-pass filtered pre-correction estimated air-fuel ratio AFestbhpf(k−N) N strokes before the current point is used to obtain the high-pass filtering process value difference (and thus the correction coefficient Gfs) in this way is because it take a predetermined time (i.e., the time lag corresponding to the number of strokes N) from the time that gas having the pre-correction estimated air-fuel ratio AFestb is discharged from the combustion chamber 25 into the exhaust passage until that gas air-fuel ratio is expressed in the output abyfs of the air-fuel ratio sensor 67. As a result, the high-pass filtering process value difference is the difference between the fluctuating values with only a high frequency component, and the difference between two values indicative of the same gas air-fuel ratio. Therefore, the high-pass filtering process value difference (and thus the correction coefficient Gfs) can genuinely be calculated as a value accurately indicating a temporary error in the pre-correction estimated air-fuel ratio AFestb (k−N) without being affected by the manner of gas contact or the gas composition.

In step 825, a correction value "offset" used for correcting the pre-correction estimated air-fuel ratio AFestb is set to a value equal to the product of a predetermined coefficient K2 (a positive constant value) multiplied by a low-pass filtered sub-feedback control amount vafsfblp, to be described later, which is a value obtained by low-pass filter processing the sub-feedback control amount vafsfb. Accordingly, the correction value offset is set to a value that fluctuates around "0".

The air-fuel ratio of gas flowing out from the upstream side catalyst 53 changes constantly and relatively smoothly due to the oxygen storage function of the upstream side catalyst 53 so the output Voxs of the oxygen content sensor 68 also changes constantly and relatively smoothly. The low-pass filtered sub-feedback control amount vafsfblp is a value indicative of the average shift amount of the air-fuel ratio downstream of the upstream side catalyst 53 with respect to the stoichiometric air-fuel ratio. Therefore, the correction value offset can be calculated to a value that accurately indicates the constant error in the pre-correction estimated air-fuel ratio AFestb.

In step 830, a (post-correction) estimated air-fuel ratio AFest(k−N) N strokes before the current point is set to a value equal to the product of the correction coefficient Gfs multiplied by the pre-correction estimated air-fuel ratio AFestb(k−N) N strokes before the current point that was already calculated in step 805 earlier plus the correction value offset. As a result, the post-correction estimated air-fuel ratio AFest(k−N) N strokes before the current time is obtained so that the temporary error in the error in the pre-correction estimated air-fuel ratio AFestb(k−N) N strokes before the current time is reduced by the correction with the correction coefficient Gfs and the constant error in the error in the pre-correction estimated air-fuel ratio AFestb(k−N) N strokes before the current time is reduced by the correction from the correction value offset.

Figure 9:
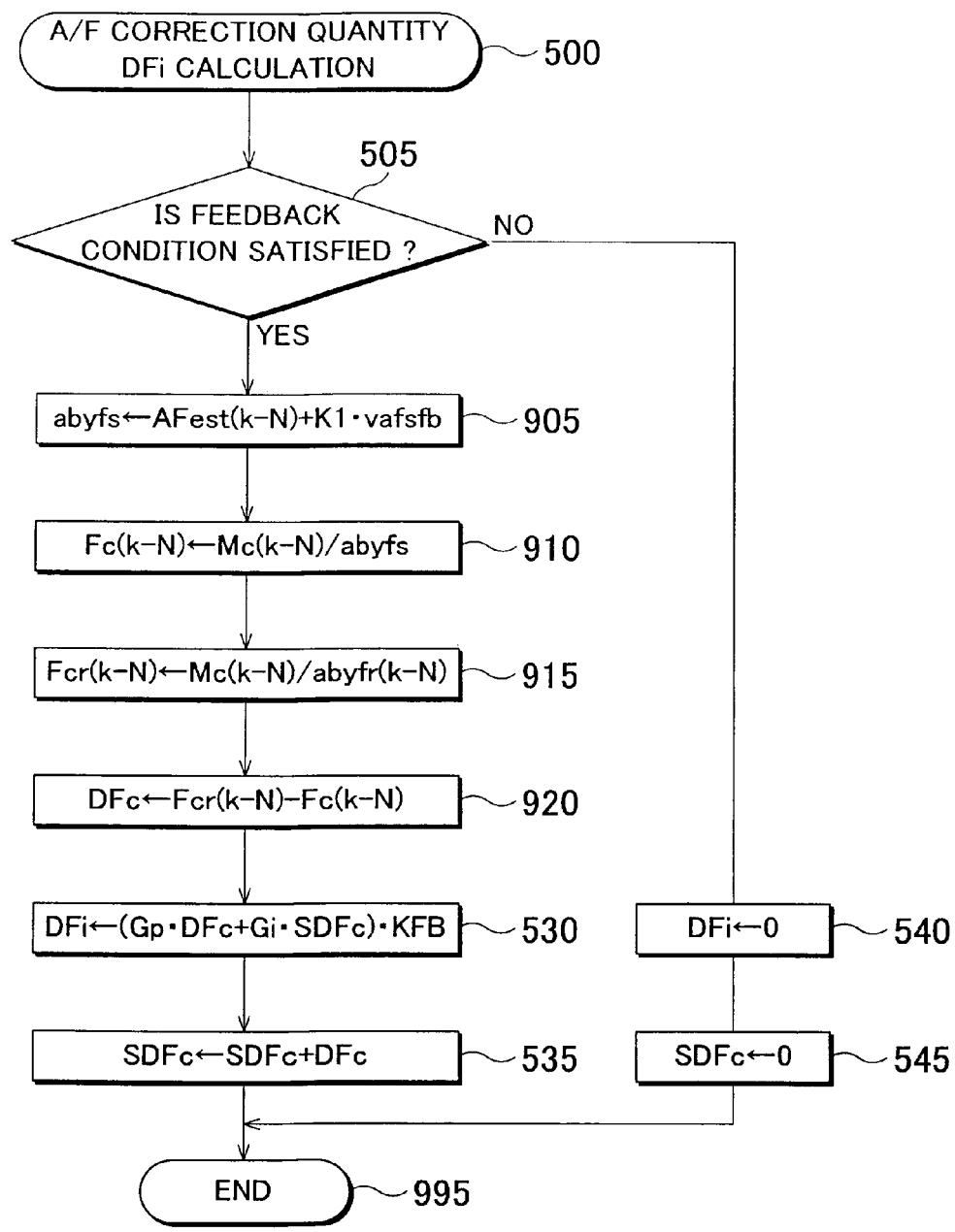
FIG. 9 is a flowchart illustrating a routine that the CPU of the air-fuel ratio control apparatus according to the second example embodiment of the invention executes to calculate an air-fuel ratio feedback correction quantity.

The CPU 81 in the second example embodiment repeatedly executes the routine for calculating the air-fuel ratio feedback correction amount DFi shown in FIG. 9 which corresponds to the routine shown in FIG. 5 in the first example embodiment for each cylinder in synchronization with the execution of the routine shown in FIG. 3, just like the routine shown in FIG. 5. The routine shown in FIG. 9 differs from the routine shown in FIG. 5 only in that steps 510 to 525 in FIG. 5 have been replaced with steps 905 to 920.

In step 905, the upstream side control air-fuel ratio abyfs N strokes before the current time is obtained by adding the same value (K=K1×vafsfb) as that used in step 510 to the (post-correction) estimated air-fuel ratio AFest(k−N) N strokes before the current time which was obtained earlier in step 830 in FIG. 8.

In step 910, the in-cylinder fuel supply amount Fc(k−N) N strokes before the current time is obtained by dividing the in-cylinder intake air quantity Mc(k−N) N strokes before the current time by the obtained upstream side control air-fuel ratio abyfs N strokes before the current time.

In step 915, a target in-cylinder fuel supply amount Fcr(k−N) N strokes before the current time is obtained by dividing the in-cylinder intake air quantity Mc(k−N) N strokes before the current time by a target air-fuel ratio abyfr(k−N) N strokes before the current time (in this example, by the stoichiometric air-fuel ratio).

In step 920, the in-cylinder fuel supply amount difference DFc is set as a value equal to the difference of the target in-cylinder fuel supply amount Fcr(k−N) N strokes before the current time minus the in-cylinder fuel supply amount Fc(k−N) N strokes before the current time. That is, in the second example embodiment, the in-cylinder fuel supply amount difference DFc is an amount indicative of the excess or insufficiency of fuel supplied into the cylinder at a time N strokes before the current time.

As a result, reflecting the air-fuel ratio feedback correction quantity DFi calculated next in step 530 in the fuel injection quantity Fi(k) through steps 315 and 320 in FIG. 3 compensates for the excess or insufficiency of the fuel supply amount at a time N strokes before the current time such that average value of the air-fuel ratio of the engine (and thus the air-fuel ratio of gas flowing into the upstream side catalyst 53) is made to substantially match the target air-fuel ratio abyfr (i.e., the stoichiometric air-fuel ratio).

Figure 10:
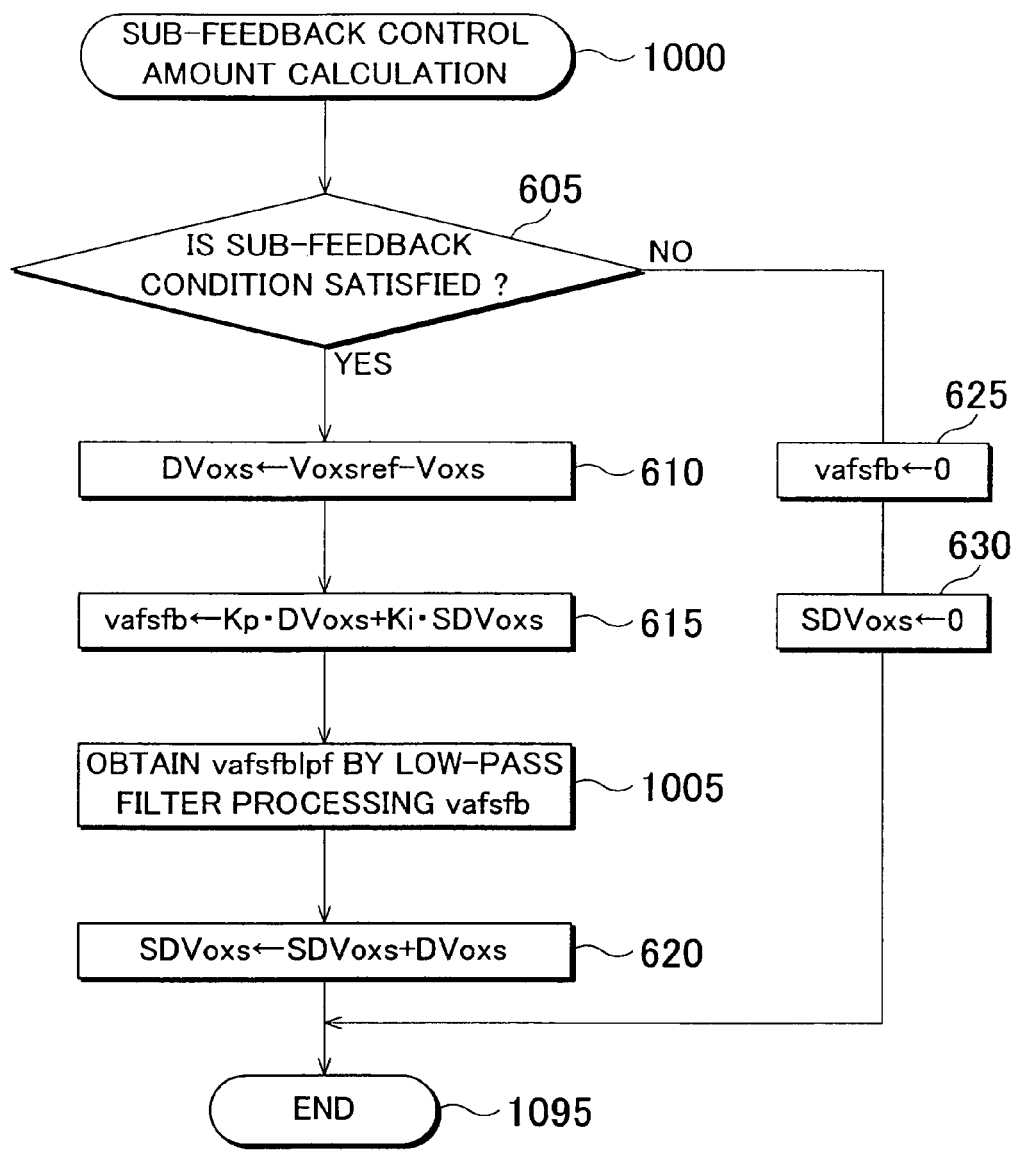
FIG. 10 is a flowchart illustrating a routine that the CPU of the air-fuel ratio control apparatus according to the second example embodiment of the invention executes to calculate a sub-feedback control amount.

Also, the CPU 81 in the second example embodiment repeatedly executes the routine for calculating the sub-feedback correction amount shown in FIG. 10 which corresponds to the routine shown in FIG. 6 in the first example embodiment for each cylinder in synchronization with the execution of the routine shown in FIG. 3, just like the routine shown in FIG. 6. The routine shown in FIG. 10 differs from the routine shown in FIG. 6 only in that step 1005 has been inserted between steps 615 and 620.

In step 1005, the low-pass filtered sub-feedback control amount vafsfblpf is obtained by low-pass filter processing the sub-feedback control amount vafsfb calculated in step 615. This low-pass filtered sub-feedback control amount vafsfblpf is used when obtaining the correction value offset that is used to correct the pre-correction estimated air-fuel ratio AFestb earlier in step 825 in FIG. 8, as described above.

Next, as described above, with the air-fuel ratio control apparatus according to the second example embodiment of the invention, the post-correction estimated air-fuel ratio AFest is obtained (see step 830 in FIG. 8) by correcting the pre-correction estimated air-fuel ratio AFestb such that the constant error and the temporary error in the pre-correction estimated air-fuel ratio AFestb both decrease by the correction using the correction coefficient Gfs of the pre-correction estimated air-fuel ratio AFestb and the correction using the correction value offset of the pre-correction estimated air-fuel ratio AFestb. Accordingly, even if the air-fuel ratio changes temporarily, the error in the post-correction estimated air-fuel ratio AFest can be kept to a low value. This post-correction estimated air-fuel ratio AFest is used in the air-fuel ratio feedback control (see step 905 in FIG. 9). Accordingly, even if the air-fuel ratio temporarily changes, appropriate air-fuel ratio feedback control is able to be maintained.

In addition, a value obtained by high-pass filter processing the output vabyfs of the air-fuel ratio sensor 67 (i.e., the high-pass filtered upstream side detected air-fuel ratio AFdhpf) is used, instead of the output vabyfs itself, in the air-fuel ratio feedback control. Therefore, an inexpensive limiting current oxygen content sensor in which constant error (and thus error that can be removed by the high-pass filter) tends to occur in the output vabyfs can be used for the air-fuel ratio sensor 67 which is the upstream side air-fuel ratio sensor, thus making it possible to suppress an increase in manufacturing costs with respect to the first example embodiment in which the upstream side air-fuel ratio sensor is not necessary.

This invention is not limited to the foregoing example embodiments. To the contrary, various modifications may be employed within the scope of the invention. For example, the second example embodiment is applied to an internal combustion engine provided with an air-fuel ratio sensor 67 which is an upstream side air-fuel ratio sensor, and the oxygen content sensor 68 which is the downstream side air-fuel ratio sensor. The invention may also be applied, however, to an internal combustion engine provided with the air-fuel ratio sensor 67, i.e., the upstream side air-fuel ratio sensor, but not the oxygen content sensor 68, i.e., the downstream side air-fuel ratio sensor.

In this case, step 825 in FIG. 8 is omitted, as is the addition of the correction value offset in step 830 in FIG. 8, the addition of the value K1×vafsfb in step 905 in FIG. 9, and the entire routine in FIG. 10.

Also, in the second example embodiment, the (post-correction) estimated air-fuel ratio AFest is obtained by correcting the pre-correction estimated air-fuel ratio AFestb using the correction coefficient Gfs and the correction value offset (see step 830 in FIG. 8). Alternatively, however, the correction of the pre-correction estimated air-fuel ratio AFestb using the correction value offset (i.e., the addition of the correction value offset) may be omitted.

Also, in the second example embodiment, when calculating the correction value offset, the low-pass filtered sub-feedback control amount vafsfblpf, which is a value obtained from low-pass filter processing the sub-feedback control amount vafsfb, is used (see step 825 in FIG. 8). Alternatively, however, the sub-feedback control amount vafsfb itself may be used instead of the low-pass filtered sub-feedback control amount vafsfblpf.

Also, in each of the foregoing example embodiments, the combustion rate coefficient T is determined based on the engine speed NE, the in-cylinder intake air quantity Mc(k), and the coolant temperature THW. Alternatively, however, the combustion rate coefficient T may also be determined based on any one or two of the engine speed NE, the in-cylinder intake air quantity Mc(k), and the coolant temperature THW.

Also, in each of the foregoing example embodiments, the air-fuel ratio feedback control that is based on the estimated air-fuel ratio AFest and the output Voxs of the oxygen content sensor 68 is executed by obtaining the air-fuel ratio feedback correction quantity DFi using the upstream side control air-fuel ratio abyfs, which is obtained by adding the value (=K1× vafsfb) that is based on the sub-feedback control amount vafsfb to the estimated air-fuel ratio AFest, and then setting the fuel injection quantity Fi to the sum of the base fuel injection quantity Fbase plus the air-fuel ratio feedback correction quantity DFi. Alternatively, however, the air-fuel ratio feedback control that is based on the estimated air-fuel ratio AFest and the output Voxs of the oxygen content sensor 68 may be executed by obtaining the upstream side air-fuel ratio feedback correction quantity based on the estimated air-fuel ratio AFest while obtaining the downstream side air-fuel ratio feedback correction quantity separately from the upstream side air-fuel ratio feedback correction quantity based on the output Voxs of the oxygen content sensor 68, and then determining the fuel injection quantity Fi based on the base fuel injection quantity Fbase, the upstream side feedback correction quantity, and the downstream side feedback correction quantity.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An air-fuel ratio control apparatus of an internal combustion engine, comprising:
    a catalyst arranged in an exhaust passage of the internal combustion engine;
    a downstream side air-fuel ratio sensor which is arranged in the exhaust passage downstream of the catalyst and outputs a value indicative of an air-fuel ratio of gas flowing out from the catalyst;
    a catalyst upstream air-fuel ratio estimating device which estimates an estimated upstream side estimated air-fuel ratio corresponding value which corresponds to the air-fuel ratio of gas discharged from a combustion chamber of the internal combustion engine into the exhaust passage based on an operating state of the internal combustion engine and a combustion state of the internal combustion engine; and
    an air-fuel ratio control device which controls, during a steady state operation, the air-fuel ratio of gas flowing into the catalyst based on the estimated upstream side estimated air-fuel ratio corresponding value and the output value of the downstream side air-fuel ratio sensor, wherein the estimated upstream side estimated air-fuel ratio corresponding value is obtained by:
    dividing a value representing an in-cylinder intake air quantity by a value representing a fuel injection quantity to obtain a result; and
    multiplying the result by a combustion rate coefficient to obtain the estimated upstream side estimated air-fuel ratio corresponding value, the combustion rate coefficient being calculated as a function of a speed of the internal combustion engine, the in-cylinder intake air quantity and a coolant temperature.

2. The air-fuel ratio control apparatus of an internal combustion engine according to claim 1, wherein the catalyst upstream air-fuel ratio estimating device obtains a value of a parameter that changes according to a degree of misfire in the combustion chamber, which corresponds to the combustion state, based on the operating state of the internal combustion engine, and estimates the estimated upstream side estimated air-fuel ratio corresponding value based on the operating state and the obtained value of the parameter.

3. The air-fuel ratio control apparatus of an internal combustion engine according to claim 2, wherein the catalyst upstream air-fuel ratio estimating device obtains the value of the parameter based on at least one of an operating speed of the internal combustion engine, a quantity of air drawn into the combustion chamber on an intake stroke, and a temperature of a wall surface of the combustion chamber.

4. An air-fuel ratio control apparatus of an internal combustion engine, comprising:
   a catalyst arranged in an exhaust passage of the internal combustion engine;
   an upstream side air-fuel ratio sensor which is arranged in the exhaust passage upstream of the catalyst and outputs a value indicative of an air-fuel ratio of gas discharged from a combustion chamber of the internal combustion engine into the exhaust passage;
   a catalyst upstream air-fuel ratio estimating device which estimates an estimated upstream side estimated air-fuel ratio corresponding value which corresponds to the air-fuel ratio of gas discharged from the combustion chamber of the internal combustion engine into the exhaust passage based on an operating state of the internal combustion engine and a combustion state of the internal combustion engine;
   a correcting device which corrects the estimated upstream side estimated air-fuel ratio corresponding value using a value obtained by high-pass filter processing an output value of the upstream side air-fuel ratio sensor;
   an air-fuel ratio control device which controls, during a steady state operation, the air-fuel ratio of gas flowing into the catalyst; and
   a downstream side air-fuel ratio sensor which is arranged in the exhaust passage downstream of the catalyst and outputs a value indicative of an air-fuel ratio of gas flowing out from the catalyst,
   wherein the air-fuel ratio control device controls the air-fuel ratio of gas flowing into the catalyst based on the estimated upstream side estimated air-fuel ratio corresponding value that was corrected by the correcting device, and an output value of the downstream side air-fuel ratio sensor.

5. The air-fuel ratio control apparatus of an internal combustion engine according to claim 4, wherein the estimated upstream side estimated air-fuel ratio corresponding value, is obtained by:
   dividing a value representing an in-cylinder intake air quantity by a value representing a fuel injection quantity to obtain a result; and
   multiplying the result by a combustion rate coefficient to obtain the estimated upstream side estimated air-fuel ratio corresponding value, the combustion rate coefficient being calculated as a function of a speed of the internal combustion engine, the in-cylinder intake air quantity and a coolant temperature.

6. The air-fuel ratio control apparatus of an internal combustion engine according to claim 4, wherein the correcting device corrects the estimated upstream side estimated air-fuel ratio corresponding value based also on the output value of the downstream side air-fuel ratio sensor.

7. The air-fuel ratio control apparatus of an internal combustion engine according to claim 6, wherein the correcting device corrects the estimated upstream side estimated air-fuel ratio corresponding value using a value obtained by low-pass filter processing the output value of the downstream side air-fuel ratio sensor.

8. The air-fuel ratio control apparatus of an internal combustion engine according to claim 4, wherein the catalyst upstream air-fuel ratio estimating device obtains a value of a parameter that changes according to a degree of misfire in the combustion chamber, which corresponds to the combustion state, based on the operating state of the internal combustion engine, and estimates the estimated upstream side estimated air-fuel ratio corresponding value based on the operating state and the obtained value of the parameter.

9. The air-fuel ratio control apparatus of an internal combustion engine according to claim 8, wherein the catalyst upstream air-fuel ratio estimating device obtains the value of the parameter based on at least one of an operating speed of the internal combustion engine, a quantity of air drawn into the combustion chamber on an intake stroke, and a temperature of a wall surface of the combustion chamber.

10. An air-fuel ratio control apparatus of an internal combustion engine, comprising:
    a catalyst arranged in an exhaust passage of the internal combustion engine;
    an upstream side air-fuel ratio sensor which is arranged in the exhaust passage upstream of the catalyst and outputs a value indicative of an air-fuel ratio of gas discharged from a combustion chamber of the internal combustion engine into the exhaust passage;
    a catalyst upstream air-fuel ratio estimating device which estimates an estimated upstream side estimated air-fuel ratio corresponding value which corresponds to the air-fuel ratio of gas discharged from the combustion chamber of the internal combustion engine into the exhaust passage based on an operating state of the internal combustion engine and a combustion state of the internal combustion engine;
    a correcting device which corrects the estimated upstream side estimated air-fuel ratio corresponding value using a value obtained by high-pass filter processing an output value of the upstream side air-fuel ratio sensor; and
    an air-fuel ratio control device which controls the air-fuel ratio of gas flowing into the catalyst based on the estimated upstream side estimated air-fuel ratio corresponding value that was corrected by the correcting device,
    wherein the correcting device corrects the estimated upstream side estimated air-fuel ratio corresponding value based on the difference between the value obtained by high-pass filter processing the output value of the upstream side air-fuel ratio sensor and a value obtained by high-pass filter processing the estimated upstream side estimated air-fuel ratio corresponding value.

11. The air-fuel ratio control apparatus of an internal combustion engine according to claim 10, wherein the correcting device uses, as the value obtained by high-pass filter processing the estimated upstream side estimated air-fuel ratio corresponding value, the value obtained by high-pass filter processing the estimated upstream side estimated air-fuel ratio corresponding value that was estimated a predetermined period of time before the current time, the predetermined period of time being the period of time that it takes from the time gas is discharged from the combustion chamber into the exhaust passage until the air-fuel ratio of the discharged gas is expressed as the output value of the upstream side air-fuel ratio sensor.

12. The air-fuel ratio control apparatus of an internal combustion engine according to claim 10, wherein the estimated upstream side estimated air-fuel ratio corresponding value, is obtained by:
dividing a value representing an in-cylinder intake air quantity by a value representing a fuel injection quantity to obtain a result; and
multiplying the result by a combustion rate coefficient to obtain the estimated upstream side estimated air-fuel ratio corresponding value, the combustion rate coefficient being calculated as a function of a speed of the internal combustion engine, the in-cylinder intake air quantity and a coolant temperature.

13. An air-fuel ratio control method of an internal combustion engine, comprising the steps of:
estimating an estimated catalyst upstream side estimated air-fuel ratio corresponding value which corresponds to an air-fuel ratio of gas discharged from a combustion chamber of the internal combustion engine into an exhaust passage based on an operating state of the internal combustion engine and a combustion state of the internal combustion engine; and
controlling, during a steady state operation of the internal combustion engine, the air-fuel ratio of gas flowing into a catalyst based on the estimated catalyst upstream side estimated air-fuel ratio corresponding value and an output value of a catalyst downstream side air-fuel ratio sensor, wherein the estimated catalyst upstream side estimated air-fuel ratio corresponding value is obtained by:
dividing a value representing an in-cylinder intake air quantity by a value representing a fuel injection quantity to obtain a result; and
multiplying the result by a combustion rate coefficient to obtain the estimated catalyst upstream side estimated air-fuel ratio corresponding value, the combustion rate coefficient being calculated as a function of a speed of the internal combustion engine, the in-cylinder intake air quantity and a coolant temperature.

14. The air-fuel ratio control method of an internal combustion engine according to claim 13, wherein the value of a parameter that changes according to a degree of misfire in the combustion chamber, which corresponds to the combustion state, is obtained based on the operating state of the internal combustion engine, and the estimated catalyst upstream side estimated air-fuel ratio corresponding value is obtained based on the operating state and the obtained value of the parameter.

15. The air-fuel ratio control method of an internal combustion engine according to claim 14, wherein the value of the parameter is obtained based on at least one of an operating speed of the internal combustion engine, a quantity of air drawn into the combustion chamber on an intake stroke, and a temperature of a wall surface of the combustion chamber.

16. An air-fuel ratio control method of an internal combustion engine, comprising the steps of:
estimating an estimated catalyst upstream side estimated air-fuel ratio corresponding value which corresponds to an air-fuel ratio of gas discharged from a combustion chamber of the internal combustion engine into an exhaust passage based on an operating state of the internal combustion engine and a combustion state of the internal combustion engine;
correcting the estimated catalyst upstream side estimated air-fuel ratio corresponding value using a value obtained by high-pass filter processing an output value of a catalyst upstream side air-fuel ratio sensor to obtain a corrected catalyst upstream side estimated air-fuel ratio corresponding value; and
controlling, during a steady state operation of the internal combustion engine, an air-fuel ratio of gas flowing into the catalyst based on the corrected catalyst upstream side estimated air-fuel ratio corresponding value, and an output value of a catalyst downstream side air-fuel ratio sensor.

17. The air-fuel ratio control method of an internal combustion engine according to claim 16, wherein the estimated catalyst upstream side estimated air-fuel ratio corresponding value, is obtained by:
dividing a value representing an in-cylinder intake air quantity by a value representing a fuel injection quantity to obtain a result; and
multiplying the result by a combustion rate coefficient to obtain the estimated catalyst upstream side estimated air-fuel ratio corresponding value, the combustion rate coefficient being calculated as a function of a speed of the internal combustion engine, the in-cylinder intake air quantity and a coolant temperature.

18. The air-fuel ratio control method of an internal combustion engine according to claim 16, wherein the estimated catalyst upstream side air-fuel ratio corresponding value is corrected based also on the output value of the catalyst downstream side air-fuel ratio sensor.

19. The air-fuel ratio control method of an internal combustion engine according to claim 18, wherein the estimated catalyst upstream side air-fuel ratio corresponding value is corrected using a value obtained by low-pass filter processing the output value of the catalyst downstream side air-fuel ratio sensor.

20. The air-fuel ratio control method of an internal combustion engine according to claim 16, wherein a value of a parameter that changes according to a degree of misfire in the combustion chamber, which corresponds to the combustion state, is obtained based on the operating state of the internal combustion engine, and the estimated catalyst upstream side estimated air-fuel ratio corresponding value is estimated based on the operating state and the obtained value of the parameter.

21. The air-fuel ratio control method of an internal combustion engine according to claim 20, wherein the value of the parameter is obtained based on at least one of an operating speed of the internal combustion engine, a quantity of air drawn into the combustion chamber on an intake stroke, and a temperature of a wall surface of the combustion chamber.

22. An air-fuel ratio control method of an internal combustion engine, comprising the steps of:
estimating a catalyst upstream side estimated air-fuel ratio corresponding value which corresponds to an air-fuel ratio of gas discharged from a combustion chamber of the internal combustion engine into an exhaust passage based on an operating state of the internal combustion engine and a combustion state of the internal combustion engine;
correcting the catalyst upstream side estimated air-fuel ratio corresponding value using a value obtained by high-pass filter processing an output value of a catalyst upstream side air-fuel ratio sensor; and controlling an air-fuel ratio of gas flowing into the catalyst based on the corrected catalyst upstream side estimated air-fuel ratio corresponding value, wherein the catalyst upstream side estimated air-fuel ratio corresponding value is corrected based on the difference between the value obtained by high-pass filter processing the output value of the catalyst upstream side air-fuel ratio sensor and a value obtained by high-pass filter processing the catalyst upstream side estimated air-fuel ratio corresponding value.

23. The air-fuel ratio control method of an internal combustion engine according to claim 22, wherein the value obtained by high-pass filter processing the catalyst upstream side estimated air-fuel ratio corresponding value that was estimated a predetermined of time before the current time, the predetermined period of time being the period of time that it takes from the time gas is discharged from the combustion chamber into the exhaust passage until the air-fuel ratio of the discharged gas is expressed as the output value of the catalyst upstream side air-fuel ratio sensor, is used as the value obtained by high-pass filter processing the catalyst upstream side estimated air-fuel ratio corresponding value.

24. The air-fuel ratio control method of an internal combustion engine according to claim 22, wherein the catalyst upstream side estimated air-fuel ratio corresponding value, is obtained by:

dividing a value representing an in-cylinder intake air quantity by a value representing a fuel injection quantity to obtain a result; and multiplying the result by a combustion rate coefficient to obtain the catalyst upstream side estimated air-fuel ratio corresponding value, the combustion rate coefficient being calculated as a function of a speed of the internal combustion engine, the in-cylinder intake air quantity and a coolant temperature.

* * * * *